(12) United States Patent
Fukuyama

(10) Patent No.: US 8,725,395 B2
(45) Date of Patent: May 13, 2014

(54) SYSTEM FOR CONSTRUCTING A SPANNING FOREST IN A VEHICULAR NETWORK

(75) Inventor: Junichiro Fukuyama, Princeton, NJ (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 212 days.

(21) Appl. No.: 13/347,593

(22) Filed: Jan. 10, 2012

(65) Prior Publication Data

US 2013/0179056 A1  Jul. 11, 2013

(51) Int. Cl.
*G06G 7/70* (2006.01)

(52) U.S. Cl.
USPC ............ 701/117; 340/902; 340/905; 709/225

(58) Field of Classification Search
USPC .................................. 701/117; 340/902, 905
See application file for complete search history.

(56) References Cited

U.S. PATENT DOCUMENTS

| | | | |
|---|---|---|---|
| 8,254,301 B2 * | 8/2012 | Chen et al. ................ | 370/315 |
| 2005/0088318 A1 * | 4/2005 | Liu et al. ...................... | 340/902 |
| 2007/0027610 A1 | 2/2007 | Parikh et al. | |
| 2007/0197230 A1 * | 8/2007 | Roggero et al. ........... | 455/456.1 |
| 2009/0285126 A1 * | 11/2009 | Lu et al. ..................... | 370/255 |
| 2010/0030423 A1 * | 2/2010 | Nathanson .................... | 701/35 |
| 2010/0033347 A1 | 2/2010 | Hayashi | |
| 2010/0254294 A1 * | 10/2010 | Jerbi et al. ................. | 370/312 |
| 2011/0057830 A1 * | 3/2011 | Sampigethaya et al. ...... | 342/36 |
| 2011/0231546 A1 * | 9/2011 | Nathanson .................. | 709/224 |
| 2011/0246636 A1 * | 10/2011 | Regli et al. ................. | 709/223 |
| 2013/0039357 A1 * | 2/2013 | Akita et al. ................. | 370/338 |

OTHER PUBLICATIONS

Dion, Francois et al., Virtual Test Bed for Assessing Probe Vehicle Data in IntelliDrive Systems, IEEE Transactions on Intelligent Transportation Systems, 2009, 10 pages.

Kaul, Sanjit et al., On Predicting and Compressing Vehicular GPS Traces, Proceedings of 2010 IEEE International Conference on Communications (ICC) Workshop, 2010, Capetown, 5 pages.

Lee, John et al., Vehicle Local Peer Group based Multicasting Protocol for Vehicle-to-Vehicle Communications, IEEE 4th Workshop on Vehicle to Vehicle Communications (V2VCOMM 2008), 2008, 9 pages.

Li, Yue Irene et al., An Autonomous Algorithm to Construct a Spanning Forest in a Vehicular Network—with Application in Probe Data Aggregation and Upload, Transportation Research Board 91st Annual Meeting, Jul. 31, 2011, 14 pages.

(Continued)

*Primary Examiner* — Khoi Tran
*Assistant Examiner* — Ryan Rink
(74) *Attorney, Agent, or Firm* — Patent Law Works LLP

(57) ABSTRACT

A first leader vehicle system and method for forming a first group including the first leader vehicle system is disclosed. The first leader vehicle system comprises a requesting module, a determination module and an aggregation module. The requesting module identifies a second leader vehicle system within a transmission range. The second leader vehicle system is in a second group. The requesting module chooses a first merging direction and receives a second merging direction chosen by the second leader vehicle system. The determination module determines that the first merging direction matches the second merging direction. The aggregation module aggregates probe vehicle data from the second leader vehicle system based at least in part on the determination that the first merging direction matches the second merging direction so that the first leader vehicle system merges with the second leader vehicle system to form the first group.

21 Claims, 16 Drawing Sheets

(56) References Cited

OTHER PUBLICATIONS

Shladover, Steven and Kuhn, Thomas M., Traffic Probe Data Processing for Full-Scale Vehicle-Infrastructure Integration (VII) Deployment, Journal of the Transportation Research Board, 2008, pp. 115-123, vol. 2086.

International Search Report and Written Opinion for PCT/JP2012/067634, mailed Oct. 18, 2012, 13 pages.

* cited by examiner

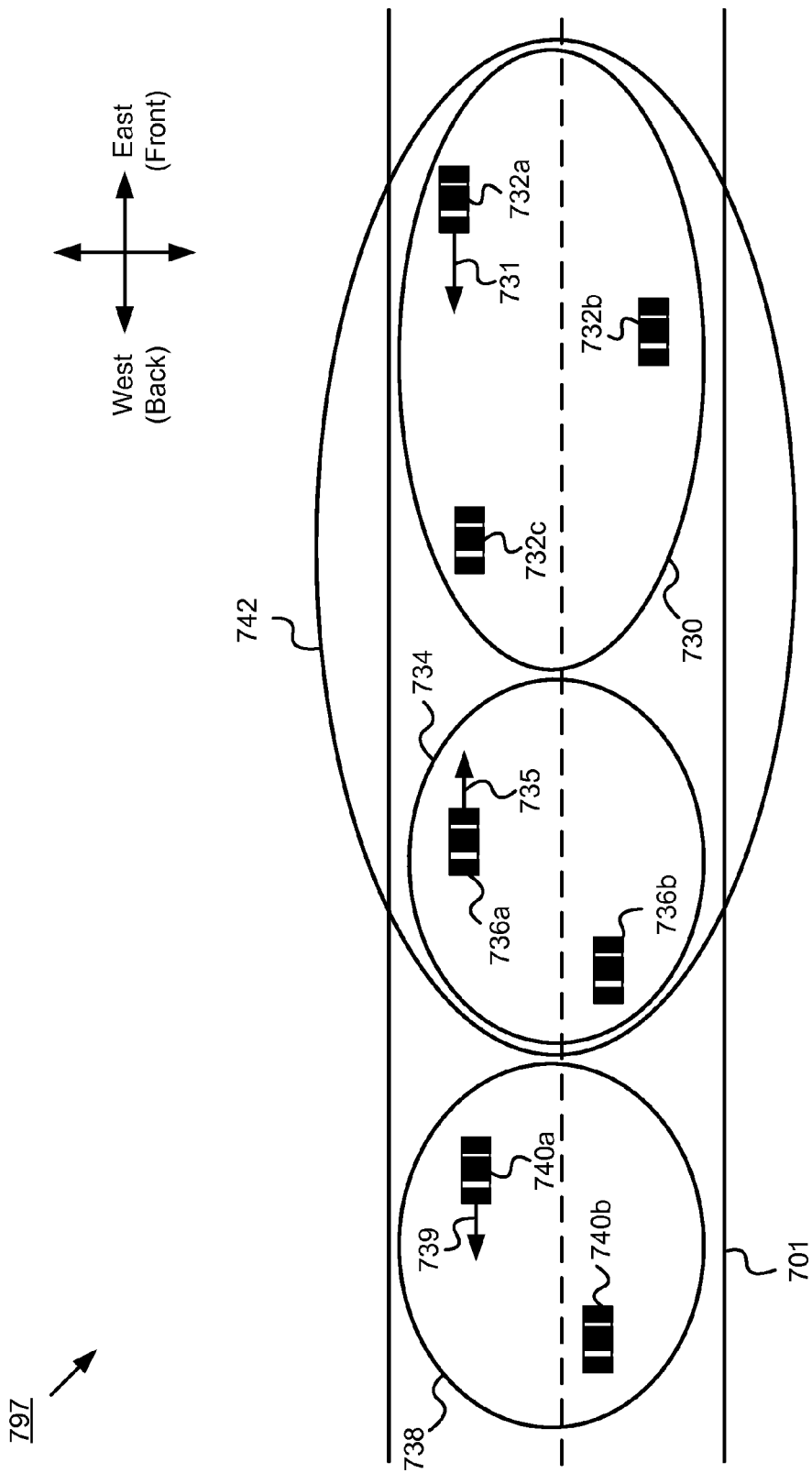

| Car Density (vehicles/meter) | 0.0039 | 0.025 | 0.0728 | 0.133 | 0.267 |
|---|---|---|---|---|---|
| Group Size (vehicles) | 1 | 2.5 | 7.28 | 13.3 | 26.7 |
| Group Forming Time (seconds) | 0 | 1.23 | 2.67 | 3.48 | 4.42 |

Figure 8

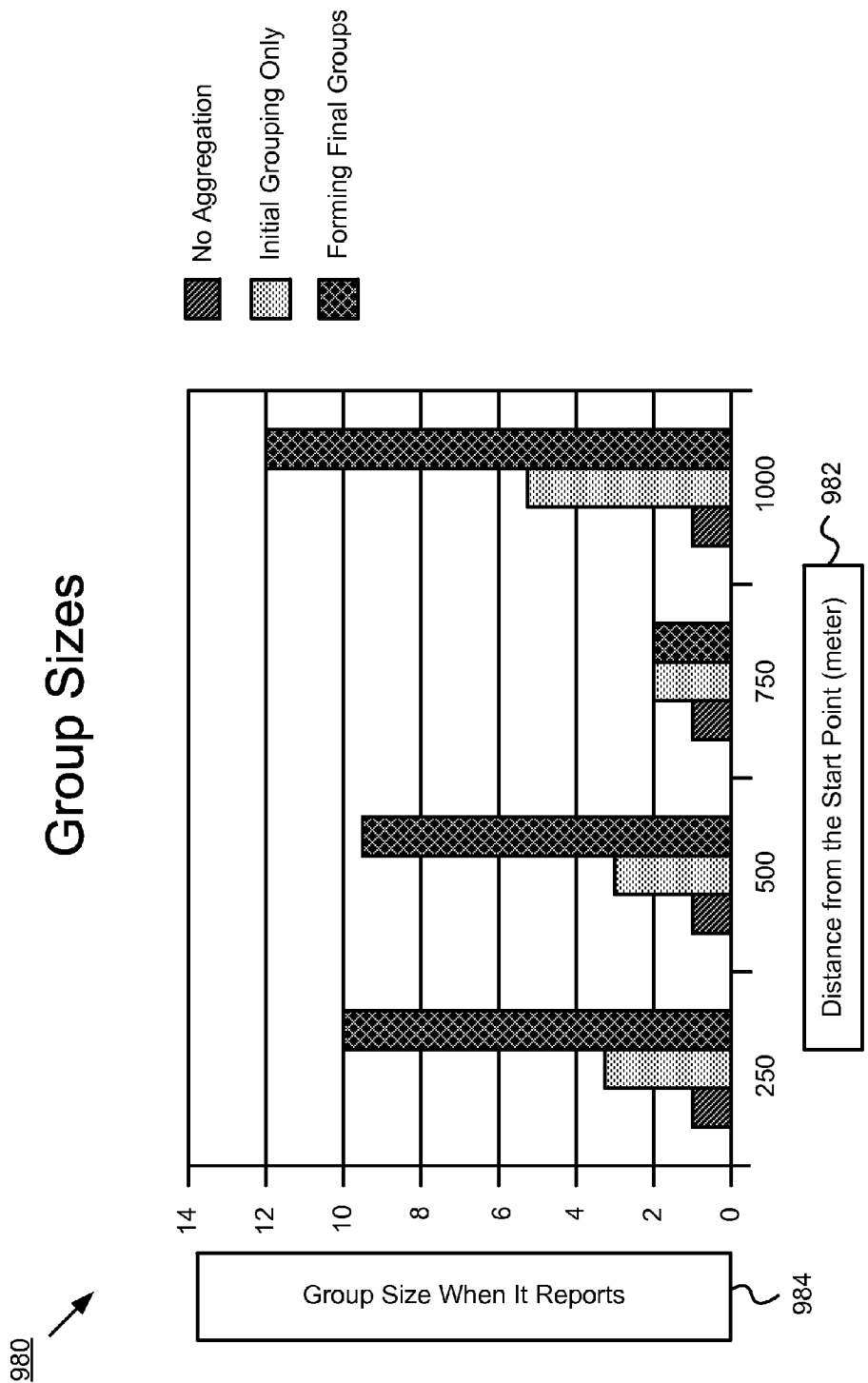

SYSTEM FOR CONSTRUCTING A SPANNING FOREST IN A VEHICULAR NETWORK

BACKGROUND

The specification relates to vehicular networking systems. In particular, the specification relates to a system and method for autonomously constructing groups of vehicle systems that form a forest in a vehicular network.

For smoothly exchanging significant information between mobile communication nodes in a vehicular network, it is beneficial to autonomously construct groups of the mobile communication nodes in the vehicular network. For example, mobile communication nodes such as vehicles are required to send their speeds to an infrastructure in a vehicular network. An existing way to do this is to have each vehicle access the infrastructure independently. However, the speeds of nearby vehicles are often similar. Therefore, if the speeds are averaged over a group via less expensive vehicular-to-vehicular communications before they are sent to the infrastructure, the high cost of the more expensive vehicular-to-infrastructure communications would be significantly reduced. Moreover, the possibility of contentions caused by a large amount of accesses to the infrastructure would be drastically reduced as well.

Existing vehicular networking systems have numerous problems. For example, in these systems it is difficult to efficiently define boundaries for disjoint groups of mobile communication nodes. Furthermore, in some situations (e.g., in an indefinitely long line of vehicles), it is not possible to decide what the boundary of a group should be deterministically by simply waiting until a neighbor group is formed.

SUMMARY OF THE INVENTION

The specification overcomes the deficiencies and limitations of the prior art at least in part by providing a first leader vehicle system and method for forming a first group including the first leader vehicle system. The first leader vehicle system comprises a requesting module, a determination module and an aggregation module. The requesting module identifies a second leader vehicle system within a transmission range. The second leader vehicle system is in a second group. The requesting module chooses a first merging direction and receives a second merging direction chosen by the second leader vehicle system. The determination module is communicatively coupled to the requesting module. The determination module determines that the first merging direction matches the second merging direction. The aggregation module is communicatively coupled to the determination module. The aggregation module aggregates probe vehicle data from the second leader vehicle system based at least in part on the determination that the first merging direction matches the second merging direction so that the first leader vehicle system merges with the second leader vehicle system to form the first group.

BRIEF DESCRIPTION OF THE DRAWINGS

The specification is illustrated by way of example, and not by way of limitation in the figures of the accompanying drawings in which like reference numerals are used to refer to similar elements.

FIGS. 7A-7D are graphical representations illustrating a vehicular network where groups of vehicle systems are formed step by step according to one embodiment.

FIG. 8 shows a table illustrating relationships between car densities and group sizes and group forming times according to one embodiment.

FIGS. 9A-9C are charts illustrating simulation results at different distances from a start point using three schemes according to one embodiment.

DETAILED DESCRIPTION OF THE PREFERRED EMBODIMENTS

Figure 1:
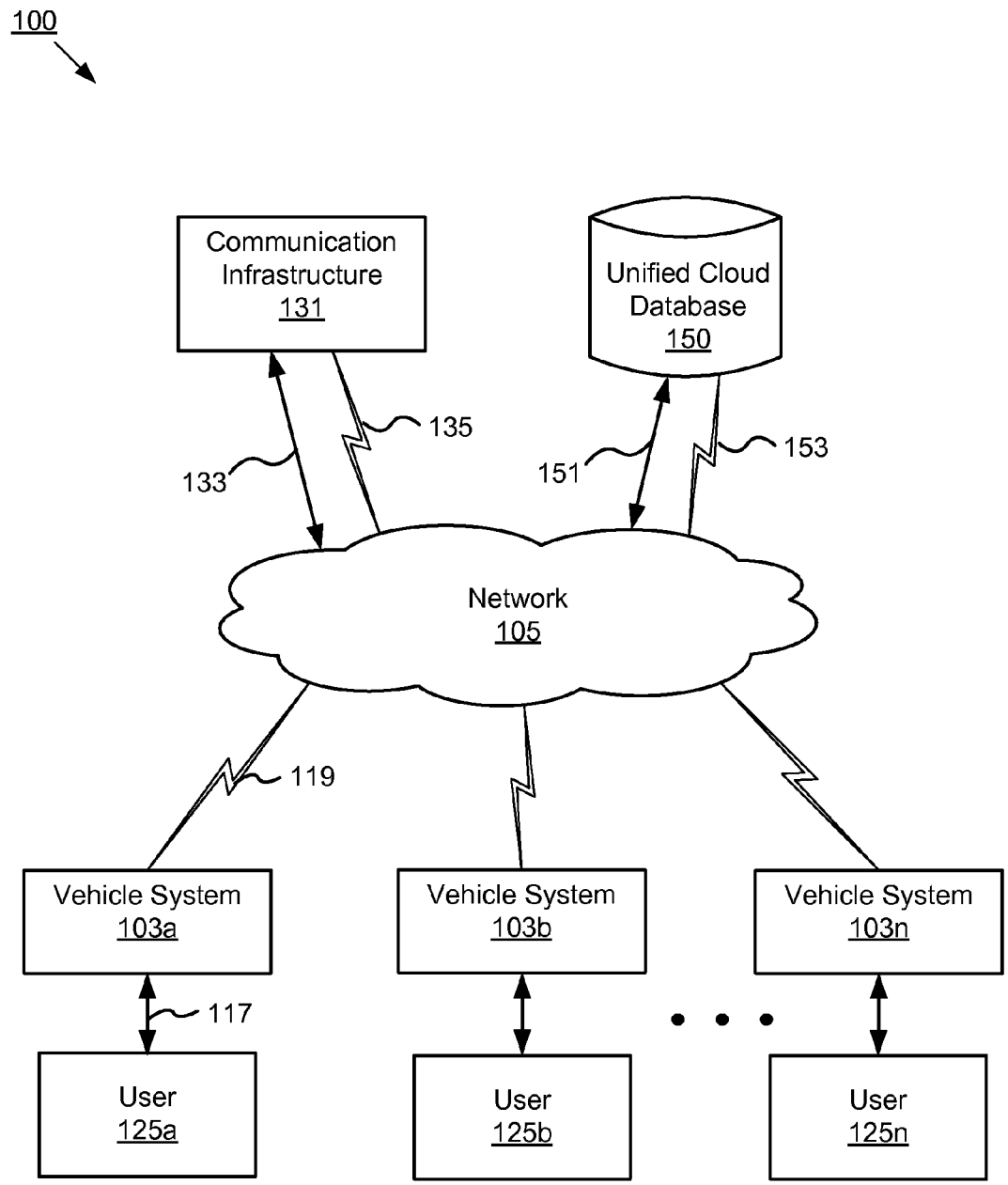
FIG. 1 is a high-level block diagram illustrating a system for constructing groups of vehicle systems according to one embodiment.

A system and method for constructing groups of vehicle systems in a vehicular network is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for forming groups of vehicle systems according to one embodiment. The illustrated system 100 includes vehicle systems 103a, 103b, 103n (referred to individually or collectively as communication systems 103) that are accessed by users 125a, 125b, 125n (also referred to collectively or individually as users 125), a communication infrastructure 131 and a unified cloud database 150. In the illustrated embodiment, the vehicle systems 103, the communication infrastructure 131 and the unified cloud database 150 are communicatively coupled via a network 105. For example, the vehicle systems 103 and the communication infrastructure 131 are communicatively coupled to one another via the network 105 to facilitate the vehicle systems 103 to transmit probe vehicle data (e.g., their average speeds) to the communication infrastructure 131. In another example, the vehicle systems 103 are communicatively coupled to one another via the network 105 to facilitate the transmitting and receiving of information (e.g., location information, their average speeds) between the vehicle systems 103.

Although three vehicle systems 103a, 103b, 103n, one communication infrastructure 131 and one unified cloud database 150 are illustrated in FIG. 1, persons having ordinary skill in the art will recognize that any number of vehicle systems 103, communication infrastructures 131 and unified cloud databases 150 can be communicatively coupled to the network 105. Furthermore, while only one network 105 is coupled to the vehicle system 103, the communication infrastructure 131 and the unified cloud database 150, persons having ordinary skill in the art will appreciate that any number of networks 105 can be connected to the vehicle system 103, the communication infrastructure 131 and the unified cloud database 150.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. For example, the network 105 is a 3G network or a 4G network. In another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In one embodiment, the network 105 is a Vehicular Ad-hoc Network (VANET) that uses moving vehicles as nodes. The network 105 is a mobile network 105 where cars fall out of the signal range and drop out of the network 105 while other cars join in.

In the illustrated embodiment, the unified cloud database 150 is communicatively coupled to the network 105 via signal line 151 and signal line 153 (wirelessly). The vehicle system 103a is communicatively coupled to the network 105 via signal line 119 (wirelessly). The user 125a interacts with the vehicle system 103a as represented by signal line 117. The vehicle systems 103b, 103n and the users 125b, 125n are coupled and interact in a similar manner respectively. In the illustrated embodiment, the communication infrastructure 131 is communicatively coupled to the network 105 via signal line 133 and signal line 135 (wirelessly). In one embodiment, signal lines 119, 135 and 151 are any combination of wireless communication channels such as one or more of a 3G, 4G, GPS or any other wireless network communication channel.

The communication infrastructure 131 is any device coupled to the network 105. For example, the communication infrastructure 131 is a cellular phone. In one embodiment, the communication infrastructure 131 is a Road Side Unit (RSU). For example, the communication infrastructure 131 is a RSU mounted on a traffic light.

In one embodiment, the communication infrastructure 131 receives probe vehicle data from the vehicle systems 103. For example, the communication infrastructure 131 receives probe vehicle data from the vehicle systems 103 when the vehicle systems 103 are nearby. The probe vehicle data includes any data from the vehicle system 103 to facilitate improving the efficiency of transportation. For example, the probe vehicle data includes a vehicle speed, a moving direction, an indication that a wiper is on or off, an amount of used gas, an amount of used wireless energy, a road condition such as a location of a detected pot hole, etc. For example, the communication infrastructure 131 receives current vehicle speeds from the vehicle systems 103 to facilitate detecting whether there is any traffic congestion on the road.

The vehicle system 103 is a system embedded in a vehicle. For example, the vehicle is a car. In one embodiment, the vehicle system 103 transmits and/or receives information to and from other vehicle systems 103 and the communication infrastructure 131 via the network 105. For example, a vehicle system 103 exchanges information (e.g., location information, probe vehicle data) with other vehicle systems 103.

In one embodiment, the vehicle system 103 sends probe vehicle data to the communication infrastructure 131. For example, the vehicle system 103 sends its current speed to a nearby communication infrastructure 131. In another embodiment, the vehicle system 103 transmits and receives information to and from other vehicle systems 103. The vehicle system 103 merges with other vehicle systems 103 into vehicle groups based at least in part on the information.

To simplify and clarify the present description, the vehicle groups will be also referred to as groups or groups of vehicle systems.

In one embodiment, the vehicle system 103 aggregates probe vehicle data from other vehicle systems 103 in the same group. For example, a vehicle system 103 receives data describing current speeds from all other vehicle systems 103 in the same group. The vehicle system 103 aggregates the received data with its existing data (e.g., data describing its own speed) by calculating an average speed over all vehicle systems 103 in the same group. The vehicle system 103 sends the average speed to the communication infrastructure 131.

In one embodiment, the vehicle systems 103 determine a leader vehicle system 103 in a group of vehicle systems. The leader vehicle system 103 receives one or more advertisements and sends the one or more advertisements to other vehicle systems 103 in the same group. In another embodiment, the vehicle system 103 exchanges status information with other vehicle systems 103 in the same group. In this way, the vehicle system 103 is aware of other vehicle systems 103 in the same group. In yet another embodiment, the leader vehicle systems 103 in different groups exchange status information with one another. The leader vehicle system 103 in each group also exchanges the status information from other groups with the vehicle systems 103 in its own group. In this way, the vehicle system 103 in one group is aware of vehicle systems 103 in other groups so that in a wider area, vehicle systems 103 are able learn about one another.

The unified cloud database 150 is an online database accessible from the network 105. For example, the unified cloud database 150 is a database where data is stored on multiple virtual servers hosted by different companies. In one embodiment, the unified cloud database 150 stores any data for providing the functionality of the system 100. In another embodiment, the unified cloud database 150 stores data received from a plurality of vehicle systems 103 and from the communication infrastructure 131.

Vehicle System 103

Figure 2:
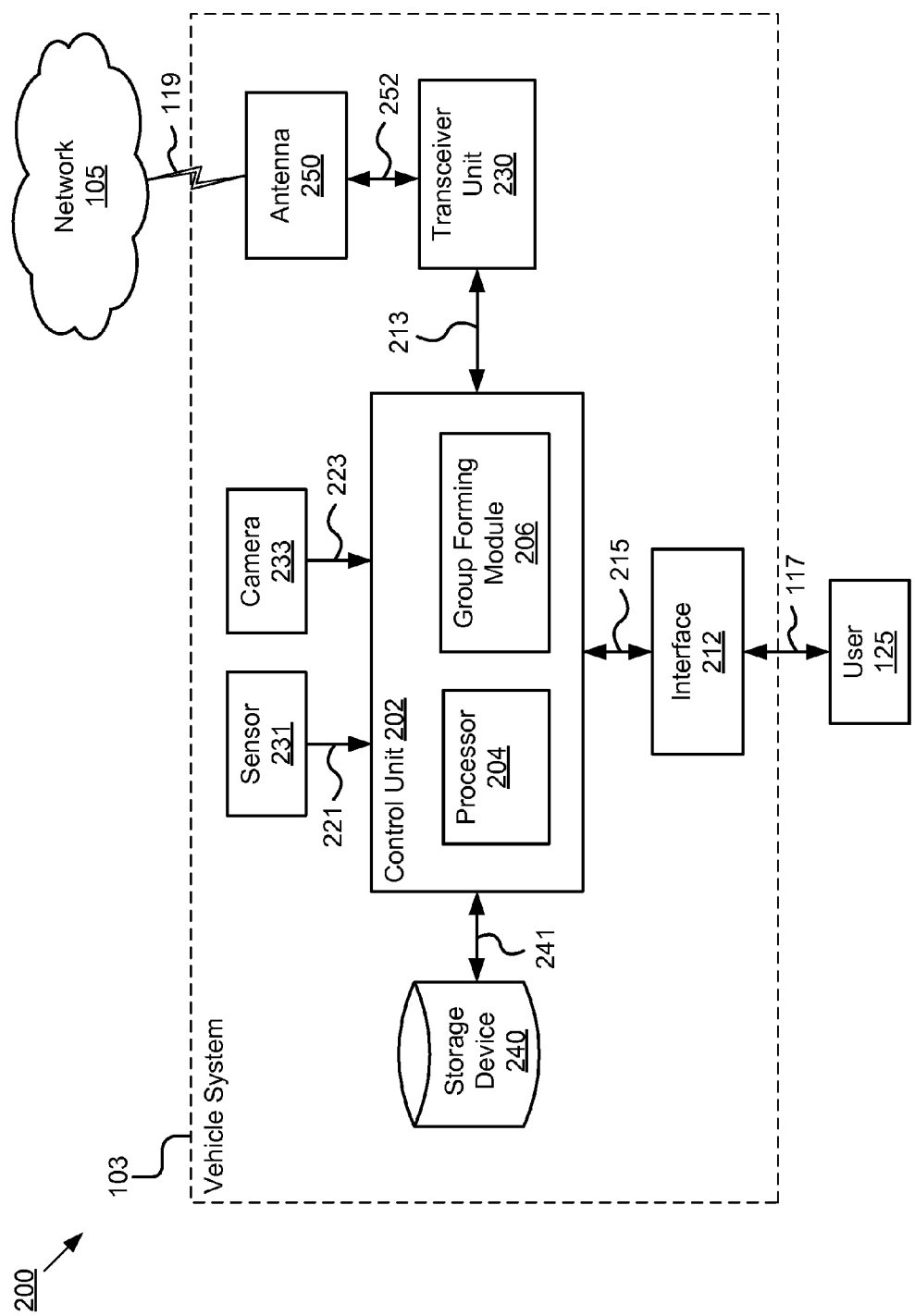
FIG. 2 is a block diagram illustrating a vehicle system in detail according to one embodiment.

Referring now to FIG. 2, depicted is an embodiment 200 of the vehicle system 103 in detail. The illustrated vehicle system 103 includes a control unit 202, a sensor 231, a camera 233, an interface 212, a storage device 240, a transceiver unit 230 and an antenna 250. Although only one sensor 231, one camera 233, one control unit 202, one interface 212, one storage device 240, one transceiver unit 230 and one antenna 250 are depicted in FIG. 2, persons having ordinary skill in the art will recognize that the communication node 101 can include any number of sensors 231, cameras 233, control units 202, interfaces 212, storage devices 240, transceiver units 230 and antennas 250. Furthermore, persons having ordinary skill in the art will also appreciate that the communication node 101 may include other entities not shown in FIG. 2 such as a speaker, a display device, an input device, etc.

In the illustrated embodiment, the sensor 231 is communicatively coupled to the control unit 202 via signal line 221. The camera 233 is communicatively coupled to the control unit 202 via signal line 223. The interface 212 is communicatively coupled to the control unit 202 via signal line 215. The user 125 interacts with the interface 212 as represented by signal line 117. The storage device 240 is communicatively coupled to the control unit 202 via signal line 241. The transceiver unit 230 is communicatively coupled to the control unit 202 via signal line 213. The transceiver unit 230 is communicatively coupled to the antenna 250 via signal line 252. The antenna 250 is communicatively coupled to the network 105 via signal line 119 (wirelessly).

The transceiver unit 230 is any computing device that transmits and receives signals. For example, the transceiver unit 230 includes a Dedicated Short Range Communications (DSRC) device. In one embodiment, the transceiver unit 230 is implemented using hardware such as field-programmable gate array (FPGA) or an application-specific integrated circuit (ASIC). In another embodiment, the transceiver unit 230 is implemented using a combination of hardware and software.

In one embodiment, the transceiver unit 230 transmits and receives signals to and from the antenna 250. The antenna 250 transmits and receives signals wirelessly to and from the network 105. In one embodiment, the transceiver unit 230 transmits and receives signals to and from transceiver units 230 in other vehicle systems 103 via the network 105. In another embodiment, the transceiver unit 230 transmits and receives signals to and from the communication infrastructure 131 via the network 105. For example, the signals are modulated and/or encoded data such as modulated and/or encoded probe vehicle data, modulated and/or encoded data describing vehicle locations, etc.

In one embodiment, the transceiver unit 230 receives data from the control unit 202. The transceiver unit 230 processes the received data by modulating and/or encoding the received data. The transceiver unit 230 then sends the modulated and/or encoded data to the transceiver units 230 in other vehicle systems 103 via the antenna 250. For example, the transceiver unit 230 receives data describing a vehicle speed from the control unit 202. The transceiver unit 230 encodes the data describing the vehicle speed. The transceiver unit 230 sends the encoded data describing the vehicle speed to the transceiver unit 230 in another vehicle system 103 via the antenna 250.

In another embodiment, the transceiver unit 230 receives signals from another vehicle system 103 via the antenna 250. The transceiver unit 230 processes the received signals. For example, the transceiver unit 230 demodulates and/or decodes the received signals to get probe vehicle data and/or data describing vehicle locations. The transceiver unit 230 sends the probe vehicle data and/or data describing vehicle locations to the control unit 202.

The control unit 202 is any processor-based computing device. For example, the control unit 202 is an electronic control unit ("ECU") implemented in a vehicle. In one embodiment, the control unit 202 is implemented using a single integrated circuit such as a system-on-chip (SOC). In one embodiment, the control unit 202 receives one or more images from the camera 233 and one or more sensor signals from the sensor 231. The control unit 202 processes the one or more images and the one or more sensor signals. The control unit 202 generates sensor data based on the processed images and sensor signals. In one embodiment, the control unit 202 stores the sensor data in the storage device 240. For example, the control unit 202 receives a sensor signal describing a vehicle speed. The control unit 202 processes the sensor signal and generates sensor data. The sensor data indicates the vehicle speed. The control unit 202 stores the sensor data in the storage device 240.

In one embodiment, the control unit 202 receives data from the transceiver unit 230. For example, the received data includes probe vehicle data and data describing vehicle locations. The data is transmitted from other vehicle systems 103 via the network 105. The control unit 202 forms one or more groups with other vehicle systems 103 based at least in part on the received data. In one embodiment, the control unit 202 aggregates probe vehicle data from vehicle systems 103 in the same group.

In one embodiment, the control unit 202 comprises, among other things, a processor 204 and a group forming module 206. In another embodiment, the control unit 202 includes other components conventional to a control unit such as a memory (not pictured) and an I/O interface (not pictured).

The processor 204 comprises an arithmetic logic unit, a microprocessor, a general purpose controller or some other processor array to perform computations, retrieve data stored on the storage device 240, etc. The processor 204 processes data signals and may comprise various computing architectures including a complex instruction set computer (CISC) architecture, a reduced instruction set computer (RISC) architecture, or an architecture implementing a combination of instruction sets. Although only a single processor 204 is shown in FIG. 2, multiple processors 204 may be included. The processing capability of the processor 204 may be limited to supporting the display of signals and the capture and transmission of signals. The processing capability of the processor might be enough to perform more complex tasks, including various types of feature extraction and sampling. It will be obvious to one skilled in the art that other processors, operating systems, sensors, displays and physical configurations are possible.

The group forming module 206 is code and routines for forming groups of vehicle systems. For example, the group forming module 206 determines to merge its vehicle system 103 (that includes the group forming module 206) with an adjacent vehicle system 103 to form a group. A group includes two or more vehicle systems 103. In one embodiment, the group forming module 206 determines that its vehicle system 103 (that includes the group forming module 206) is a leader vehicle system 103 for its group. A leader vehicle system 103 for a group is a vehicle system 103 that aggregates probe vehicle data from all vehicle systems 103 in the same group. The group forming module 206 aggregates probe vehicle data from other vehicle systems 103 in the same group with its existing probe vehicle data. In one embodiment, if the vehicle system 103 that includes the group forming module 206 is a leader vehicle system 103 for its group, the group forming module 206 determines to merge its group with an adjacent group to form a larger group. The larger group includes all vehicle systems 103 in the two adjacent groups.

In one embodiment, the group forming module 206 includes codes and routines stored in an on-chip storage of the processor 204. In another embodiment, the group forming module 206 is implemented using hardware such as a field-programmable gate array (FPGA) or an application-specific integrated circuit (ASIC). In yet another embodiment, the group forming module 206 is implemented using a combination of hardware and software. The group forming module 206 is described below in more detail with reference to FIG. 3.

The sensor 231 is any type of conventional sensor configured to collect any type of data. For example, the sensor 231 is one of the following: a light detection and ranging (LIDAR) sensor; an infrared detector; a motion detector; a thermostat; and a sound detector, etc. Persons having ordinary skill in the art will recognize that other types of sensors are possible. In one embodiment, the sensor 231 measures a condition related to a vehicle. The sensor 231 generates a sensor signal describing the condition based on the measurement. For example, the sensor 231 measures one of a steering angle, a brake angle, a vehicle speed, a moving direction, an acceleration and/or deceleration of a vehicle, a temperature inside a vehicle, whether fog lights are on and whether windshield wipers are on or off, an amount of used gas, an amount of used wireless energy, etc. The sensor 231 generates a sensor signal describing the measurement. In another embodiment, the sensor 231 measures a condition in an environment that is external to the vehicle and generates a sensor signal describing the measurement. For example, the sensor 231 measures a percentage of humidity in an environment and generates a sensor signal describing the measurement. In another example, the sensor 231 detects a pot hole on the road and measures the location of the pot hole on the road. The sensor 231 generates a sensor signal describing the location of the pot hole on the road. The sensor 231 sends the sensor signal to the control unit 202.

In one embodiment, the vehicle system 103 includes a combination of different types of sensors 231. For example, the vehicle system 103 includes a first sensor 231 for monitoring a steering angle of a steering device in a vehicle, a second sensor 231 for monitoring a speed of the vehicle and a third sensor 231 for monitoring a brake angle of a brake device in the vehicle.

The camera 233 is an optical device for recording images. For example, the camera 233 takes pictures of roads, traffic lights, vehicles, pedestrians crossing the road, etc., external to a vehicle as the vehicle is driven down a road. In one embodiment, the camera 233 captures images and stores the images in the storage device 240 as sensor data. In one embodiment, the camera 233 is mounted in the front of a vehicle. In other embodiments, the camera 233 is mounted on other portions of the vehicle. In one embodiment, the camera 233 is configured to capture a video including successive frames that describe an environment surrounding a road when a driver is driving a vehicle on the road. The camera 233 sends the images to the control unit 202. The control unit 202 then processes the images and stores processed images in the storage device 240 as sensor data.

The interface 212 is a device configured to handle communications between the user 125 and the control unit 202. For example, the interface 212 includes one or more of an in-vehicle touch screen for receiving inputs from the user 125 and a microphone for capturing voice inputs from the user 125. The interface 212 sends the inputs from the user 125 to the control unit 202. In one embodiment, the interface 212 is configured to transmit an output from the control unit 202 to the user 125. For example, the interface 212 includes an audio system for playing a voice prompt to the user 125 indicating traffic congestions. In other examples, the interface 212 includes a display device for displaying a road condition to the user 125. One having ordinary skill in the art will recognize that the interface 212 may include other types of devices for providing the functionality described herein.

The user 125a is a human user. In one embodiment, the user 125a is a driver driving a vehicle on a road. The user 125a interacts with, or otherwise provides an input to, an interface 212, which sends and receives different types of data to and from the control unit 202. For example, the interface 212 is a touch screen and the user 125a touches a portion of the touch screen with a finger or a stylus to provide an input.

The storage device 240 is a non-transitory memory that stores data. For example, the storage device 240 is a dynamic random access memory (DRAM) device, a static random access memory (SRAM) device, flash memory or some other memory device known in the art. In one embodiment, the storage device 240 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 240 is described below in more detail with reference to FIG. 4.

The antenna 250 is an electrical device that converts electric currents into radio waves, and vice versa. For example, the antenna 250 is a steerable beam directional antenna. The antenna 250 is used with the transceiver unit 230. In one embodiment, the antenna 250 receives signals from the network 105 and sends the received signals to the transceiver unit 230 for processing. In another embodiment, the antenna 250 receives signals from the transceiver unit 230 and delivers the signals to other vehicle systems 103 via the network 105.

Group Forming Module 206

Figure 3:
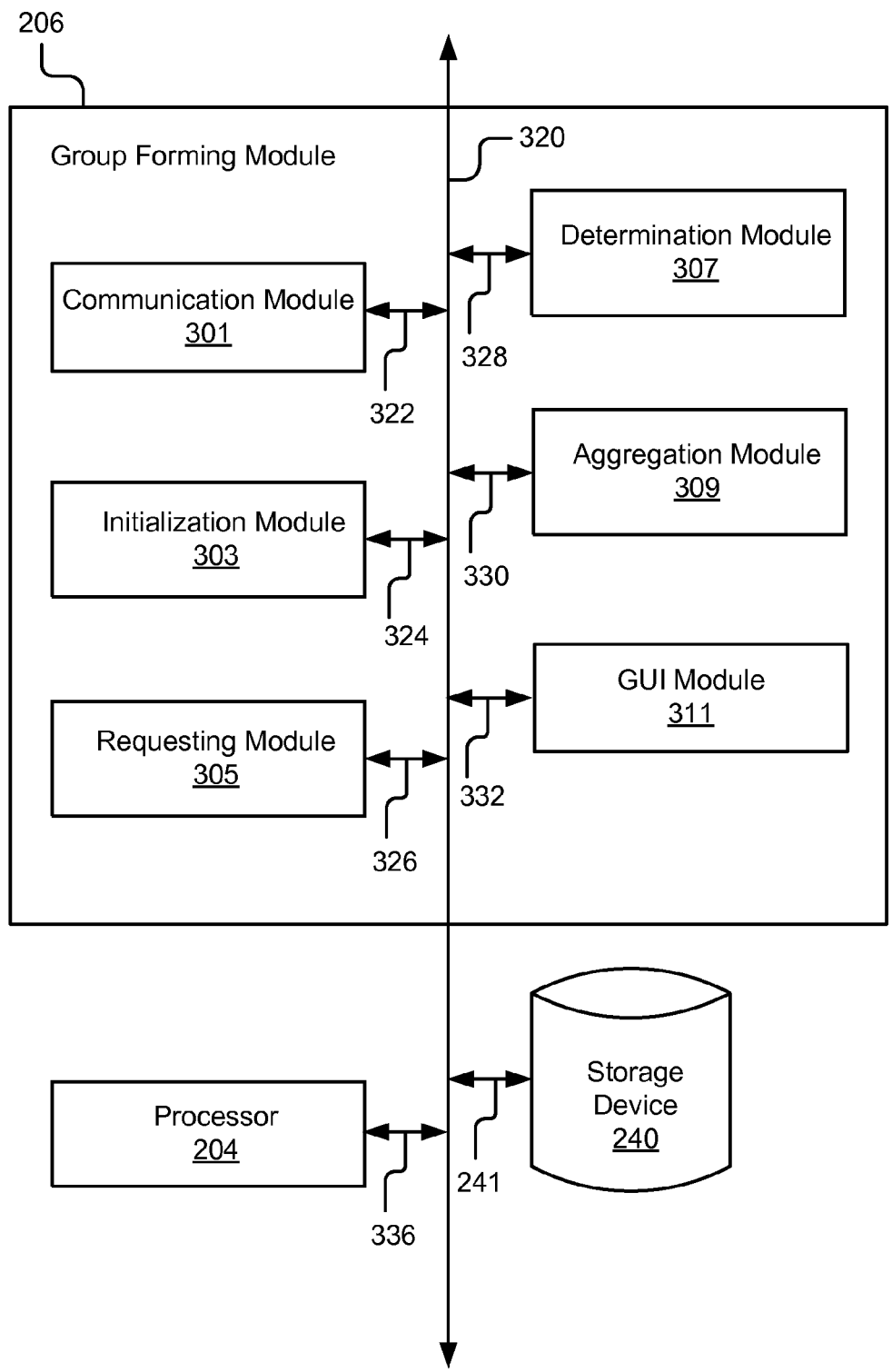
FIG. 3 is a block diagram illustrating a group forming module according to one embodiment.

Referring now to FIG. 3, a group forming module 206 is shown in more detail. FIG. 3 is a block diagram illustrating a group forming module 206 according to one embodiment. The group forming module 206 comprises a communication module 301, an initialization module 303, a requesting module 305, a determination module 307, an aggregation module 309 and a graphical user interface (GUI) module 311. These components of the group forming module 206 are communicatively coupled to a bus 320 for communication with one another. In the illustrated embodiment, the processor 204 is communicatively coupled to the bus 320 via signal line 336. The storage device 240 is communicatively coupled to the bus 320 via signal line 241.

The communication module 301 is code and routines for handling communication between components of the group forming module 206 and other components of the vehicle system 103. For example, the communication module 301 receives periodic beacon messages from the network 105. The periodic beacon messages include information in relevance to vehicle systems 103 such as location information of vehicle systems 103. The communication module 301 delivers the periodic beacon messages to the initialization module 303. In one embodiment, the communication module 301 also stores the periodic beacon messages in the storage device 240. The communication module 301 is communicatively coupled to the bus 320 via signal line 322.

In one embodiment, the communication module 301 receives data indicating a global clock from the network 105. For example, the communication module 301 receives a Global Positioning System (GPS) signal that indicates a global clock. The communication module 301 stores the global clock in the storage device 240. In one embodiment, the communication module 301 uses the global clock to synchronize its vehicle system 103 (that includes the communication module 301) with other vehicle systems 103. For example, the communication module 301 triggers the other components in the group forming module 206 to start forming groups using the global clock. The communication modules 301 in other vehicle systems 103 trigger the start of the group forming process using the same global clock. In this way, vehicle systems 103 start the group forming process time-synchronously.

In another example, the communication module 301 also synchronizes each step of the group forming process using the global clock. For example, the communication module 301 updates and/or corrects an elapsed time using the global clock after each recursive step of the group forming process. The elapsed time is the time spent on one recursive step of the group forming process. The communication module 301 sends the elapsed time to the determination module 307. In one embodiment, the communication module 301 also stores the elapsed time to the storage device 240.

In one embodiment, the communication module 301 sends and/or receives a merging request to and/or from another vehicle system 103. For example, the merging request includes vehicle location information and/or a chosen merging direction (e.g., back, front). For example, the communication module 301 receives a merging request from the requesting module 305. The communication module 301 sends the merging request to another vehicle system 103. In another example, the communication module 301 receives a merging request from another vehicle system 103. The communication module 301 delivers the received merging request to the requesting module 305.

In another embodiment, the communication module 301 sends and/or receives a response to a merging request to and/or from another vehicle system 103. For example, the communication module 301 receives a response to a merging request from the requesting module 305. The communication module 301 sends the response to the merging request to another vehicle system 103. In another example, the communication module 301 receives a response to a merging request from another vehicle system 103. The communication module 301 delivers the response to the merging request to the requesting module 305.

In one embodiment, the communication module 301 sends and/or receives probe vehicle data to and/or from another vehicle system 103. For example, the probe vehicle data is a vehicle speed. For example, the communication module 301 receives probe vehicle data from the aggregation module 309. The communication module 301 sends the probe vehicle data to another vehicle system 103. In another example, the communication module 301 receives probe vehicle data from another vehicle system 103. The communication module 301 delivers the received probe vehicle data to the aggregation module 309.

In one embodiment, the communication module 301 receives graphical data from the GUI module 311. The communication module 311 sends the graphical data to the interface 212 via the control unit 202 for displaying information to a user 125. For example, the graphical data is used to generate a user interface for displaying transmitted probe vehicle data (e.g., a vehicle speed, a road condition, a status and/or an action of the vehicle, etc.) to the user 125.

In one embodiment, the communication module 301 also handles the communications between other sub-modules 303, 305, 307, 309 and 311 in the group forming module 206. For example, the communication module 301 communicates with the determination module 307 and the aggregation module 309 to pass an output of the determination module 307 (such as an indication of receiving probe vehicle data or an indication of sending probe vehicle data) to the aggregation module 309. However, this description may occasionally omit mention of the communication module 301 for purposes of clarity and convenience. For example, for purposes of clarity and convenience, the above scenario may be described as the determination module 307 passing an output (such as an indication of receiving probe vehicle data or an indication of sending probe vehicle data) to the aggregation module 309.

The initialization module 303 is code and routines for forming an initial group. For example, the initialization module 303 receives periodic beacon messages from the communication module 301. The periodic beacon messages include vehicle location information. The initialization module 303 forms an initial group with other vehicle systems 103 based at least in part on the vehicle location information. The initialization module 303 is communicatively coupled to the bus 320 via signal line 324.

In one embodiment, the initialization module 303 starts to initialize one or more variables according to a global clock received from the communication module 301. For example, when the global clock runs to a pre-determined time, the initialization module 303 starts to initialize one or more variables. For example, the variables include a leader flag variable, a group size variable, a level variable, an elapsed time variable. The initialization module 303 sets the leader flag variable to true to indicate that this current vehicle system 103 (that includes the initialization module 303) is a leader vehicle system 103. The initialization module 303 assigns a "1" to the group size variable, which indicates that the group includes only this current vehicle system 103 (that includes the initialization module 303) its own. The initialization module 303 assigns a "0" to the level variable to indicate that this current vehicle system 103 (that includes the initialization module 303) has not merged with other vehicle systems 103 and this current vehicle system (that includes the initialization module 303) is still in its singleton group. The initialization module 303 assigns a "0" to the elapsed time variable initially. In one embodiment, the initialization module 303 stores the variables in the storage device 240.

In one embodiment, the initialization module 303 determines whether another leader vehicle system 103 is located in a lane to the left of the current vehicle system 103 (that includes the initialization module 303) and is located closely enough to this current vehicle system 103 (that includes the initialization module 303) based at least in part on the periodic beacon messages. For example, the periodic beacon messages include location information of leader vehicle systems 103 in a proximity of this current vehicle system 103 (that includes the initialization module 303). The initialization module 303 obtains the locations of these leader vehicle systems 103 from the periodic beacon messages. The initialization module 303 then determines if there is any leader vehicle system 103 in a lane to the left and within a maximum distance based on the locations of these leader vehicle systems 103. For example, the maximum distance is from 0-15 meters. In one embodiment, the maximum distance is 10 meters.

If the initialization module 303 determines that another leader vehicle system 103 is in a lane to the left of this current vehicle system 103 (that includes the initialization module 303) and is within in a maximum distance, the initialization module 303 merges with the leader vehicle system 103 in the left lane by sending its probe vehicle data to the leader vehicle system 103 in the left lane. In one embodiment, if the initialization module 303 determines that there are more than one leader vehicle systems 103 in a lane to the left and within a maximum distance, the initialization module 303 chooses either the closest vehicle to merge with or chooses the most leftmost vehicle to merge with or randomly chooses one of them. In one embodiment, the initialization module 303 also sets the leader flag variable to false after sending out its probe vehicle data. In this way, the initialization module 303 merges with the leader vehicle system 103 in the left lane to form an initial group.

In another embodiment, the initialization module 303 receives probe vehicle data from a leader vehicle system 103 in a lane to the right and within a maximum distance via the communication module 301. The initialization module 303 sends the received probe vehicle data to the aggregation module 309. In this way, the initialization module 303 forms an initial group. For example, the initial group includes this current leader vehicle system 103 (that includes the initialization module 303) and one or more vehicle systems 303 in the right lanes.

One advantage to forming initial groups is to avoid the difficulty in distinguishing which of two vehicles that are close together is ahead of the other vehicle. Furthermore, it is faster to achieve a forest including groups by starting with forming initial groups of small sizes using this straightforward method than by having several singleton groups send merging requests to one another. The method of forming initial groups depends on assumptions that the vehicles in the left lanes are faster, and that faster vehicles have lower chances of withdrawing from groups, and thus are more suitable to be the leader vehicles of groups.

The requesting module 305 is code and routines for generating a merging request. For example, the requesting module 305 generates a merging request including a merging direction. The requesting module 305 sends the merging request to another leader vehicle system 103 via the communication module 301. The requesting module 305 is communicatively coupled to the bus 320 via signal line 326.

In one embodiment, the requesting module 305 determines if any other leader vehicle systems 103 exist within a transmission range of this current vehicle system 103 (that includes the requesting module 305) based at least in part on the periodic beacon messages received from the communication module 301. For example, the transmission range is from 50 meters to hundreds of meters, such as 100 meters. The periodic beacon messages indicate the locations of other leader vehicle systems 103. The requesting module 305 determines if any other leader vehicle systems 103 are within the transmission range based at least in part on the locations of other leader vehicle systems 103.

If the requesting module 305 detects other leader vehicle systems 103 within the transmission range, the requesting module 305 identifies a leader vehicle system 103 from the detected leader vehicle systems 103. In one embodiment, the requesting module 305 chooses a merging direction randomly. For example, the requesting module 305 chooses a merging direction from the options, "back" and "front." Therefore, the requesting module 305 chooses a merging direction of either back or front by a probability of one half. Then the requesting module 305 identifies a closest leader vehicle system 103 in the chosen merging direction as a candidate leader vehicle system 103 if one exists. If there is no leader vehicle system 103 in the chosen merging direction, the requesting module 305 identifies a leader vehicle system 103 closest to it as a candidate leader vehicle system 103 regardless of its direction. For example, the requesting module 305 identifies a leader vehicle system 103 in an adjacent group as a candidate leader vehicle system 103.

In one embodiment, the requesting module 305 sends a chosen merging direction to the determination module 307. In another embodiment, the requesting module 305 stores the chosen merging direction in the storage device 240. For purposes of clarity and convenience, a merging direction chosen by this current vehicle system 103 (that includes the requesting module 305) is referred to as a, "first merging direction" herein.

In one embodiment, the requesting module 305 generates a merging request. For example, the requesting module 305 generates a merging request that includes the first merging direction. In another example, the merging request also includes location information of this current vehicle system 103 (that includes the requesting module 305). The requesting module 305 sends the merging request including the first merging direction to the candidate leader vehicle system 103 via the communication module 301. For example, the requesting module 305 generates a merging request including a first merging direction such as the direction of "back." The requesting module 305 then sends the merging request to a candidate leader vehicle system 103 that is behind this current vehicle system 103 (that includes the requesting module 305) and is the closest vehicle to this current vehicle system 103 (that includes the requesting module 305).

In one embodiment, the requesting module 305 receives a response to a merging request from a candidate leader vehicle system 103. For example, the response to the merging request is from a candidate leader vehicle system 103 in the first merging direction. The response to the merging request includes a merging direction chosen by the candidate leader vehicle system 103. In one embodiment, the response to the merging request includes a level variable of the candidate leader vehicle system 103. The merging direction chosen by the candidate leader vehicle system 103 is referred to as a, "second merging direction" herein. The requesting module 305 sends the second merging direction to the determination module 307. In one embodiment, the requesting module 305 also stores the second merging direction in the storage device 240.

In another embodiment, the requesting module 305 receives a merging request from another leader vehicle system 103. The requesting module 305 sends a response to the merging request to the leader vehicle system 103. For example, the response to the merging request includes a merging direction chosen by this current vehicle system 103 (that includes the requesting module 305). In another example, the response to the merging request also includes a level variable of this current vehicle system 103 (that includes the requesting module 305).

The determination module 307 is code and routines for determining whether to merge with another leader vehicle system 103 to form a group. For example, the determination module 307 determines whether to merge with another leader vehicle system 103 based on the first and second merging directions and location information of the other leader vehicle system 103. The determination module 307 transmits an output such as a determination to the aggregation module 309. The determination module 307 is communicatively coupled to the bus 320 via signal line 328.

In one embodiment, the determination module 307 receives first and second merging directions from the requesting module 305. For example, the first and second merging directions are back and front respectively. In another embodiment, the determination module 307 also receives location information of a candidate leader vehicle system 103. For example, the location information indicates that the candidate leader vehicle system 103 is ahead of this current vehicle system 103 (that includes the determination module 307).

If this current vehicle system 103 (that includes the determination module 307) is ahead of the candidate leader vehicle system 103 and the first and second merging directions are back and front respectively, the determination module 307 determines that the first and second merging directions are directed towards each other and the two vehicle systems 103 agree to merge. Similarly, if this current vehicle system 103 (that includes the determination module 307) is behind the candidate leader vehicle system 103 and the first and second merging directions are front and back respectively, the determination module 307 also determines that the first and second merging directions directed towards each other and the two vehicle systems 103 agree to merge. Otherwise, the determination module 307 determines the first and second merging directions are not directed towards each other and the two vehicle systems 103 do not agree to merge.

In one embodiment, the determination module 307 also determines if level variables for the two vehicle systems 103 match. For example, the determination module 307 receives a level variable of the candidate leader vehicle system 103 from the requesting module 305. The determination module 307 retrieves a level variable of this current vehicle system 103 (that includes the determination module 307) from the storage device 240. Then the determination module 307 determines if the two level variables are equal. For example, if the two level variables have the same value, the determination module 307 determines the two vehicle systems 103 agree to merge.

In one embodiment, the determination module 307 determines that the leader vehicle system 103 that is ahead of another vehicle is the new leader vehicle system 103 for the new group after merging. The determination module 307 determines whether to send or to receive probe vehicle data accordingly. For example, if it is the first case, that is, if this current vehicle system 103 (that includes the determination module 307) is ahead of the candidate leader vehicle system 103 and the first and second merging directions are back and front respectively, the determination module 307 determines that this current vehicle system 103 (that includes the determination module 307) will be the new leader vehicle system 103 for the new group and it will receive probe vehicle data from the candidate leader vehicle system 103. The determination module 307 sends the determination of the receiving probe vehicle data to the aggregation module 309.

However, if it is the second case—that is, if this current vehicle system 103 (that includes the determination module 307) is behind the candidate leader vehicle system 103 and the first and second merging directions are front and back respectively, then the determination module 307 determines that the candidate leader vehicle system 103 will be the new leader vehicle system 103 for the new group and it will send its own probe vehicle data to the candidate leader vehicle system 103. The determination module 307 also sends the determination of sending probe vehicle data to the aggregation module 309.

In one embodiment, the determination module 307 determines whether the leader flag variable is true after each recursive step of the group forming process. In another embodiment, the determination module 307 determines whether the leader flag variable is true after forming an initial group. In one embodiment, the determination module 307 also determines whether the elapsed time is larger than a maximum elapsed time after each recursive step for the group forming process. For example, the maximum elapsed time is a predetermined upper bound of elapsed time such as five seconds, 10 seconds, etc. In this way, the determination module 307 determines if the next recursive step should start.

The aggregation module 309 is code and routines for aggregating probe vehicle data. For example, the aggregation module 309 receives probe vehicle data from a candidate leader vehicle system 103. The aggregation module 309 aggregates the received probe vehicle data with its existing probe vehicle data such as the probe vehicle data in the storage device 240. The aggregation module 309 is communicatively coupled to the bus 320 via signal line 330.

In one embodiment, the aggregation module 309 receives probe vehicle data from the initialization module 303. The aggregation module 309 aggregates the received probe vehicle data with its own probe vehicle data. For example, the aggregation module 309 receives a vehicle speed of another vehicle system 103 from the initialization module 303. The aggregation module 309 calculates an average vehicle speed using the received vehicle speed and the vehicle speed of this current vehicle system 103 (that includes the aggregation module 309). The aggregation module 309 stores the aggregated probe vehicle data such as the average vehicle speed in the storage device 240.

In one embodiment, the aggregation module 309 receives a determination from the determination module 307. For example, the determination indicates whether receiving or sending probe vehicle data from or to a candidate leader vehicle system 103.

If the determination indicates that it is receiving probe vehicle data from the candidate leader vehicle system 103, the aggregation module 309 sends a request for probe vehicle data to the candidate leader vehicle system 103 via the communication module 301. The aggregation module 309 then receives probe vehicle data from the candidate leader vehicle system 103. The aggregation module 309 updates probe vehicle data by aggregating the received probe vehicle data with its existing probe vehicle data. In this way, the aggregation module 309 aggregates probe vehicle data from all vehicle systems 103 in the new group since the received probe vehicle data has been aggregated by the candidate vehicle system 103 for its group. The aggregation module 309 also updates the level variable by increasing the value of the level variable by one. This indicates that this current vehicle system 103 (that includes the group forming module 309) merges with other vehicle systems 103 one more time.

If the determination indicates sending probe vehicle data to the candidate leader vehicle system 103, the aggregation module 309 sends existing aggregated probe vehicle data to the candidate leader vehicle system 103. For example, the aggregation module 309 retrieves most recently aggregated probe vehicle data from the storage device 240. The aggregation module 309 sends the most recently aggregated probe vehicle data to the candidate leader vehicle system 103.

In one embodiment, the aggregation module 309 also sets the leader flag variable to false after sending out the most recently aggregated probe vehicle data to the candidate leader vehicle system 103. In this way, the aggregation module 309 makes the leader flag variable indicate that this current vehicle system 103 (that includes the aggregation module 309) is no longer a leader vehicle system 103 for the new group. Furthermore, in this way, the aggregation module 309 terminates the group forming process for this current vehicle system 103 (that includes the aggregation module 309). However, the leader vehicle system 103 (e.g., the candidate leader vehicle system 103) for the new group continues to implement the group forming process for all vehicle systems 103 in the new group. For example, the leader vehicle system 103 for the new group communicates with other leader vehicle systems 103 for other groups to implement further merging.

The GUI module 311 is code and routines for providing graphical data for a user 125. The GUI module 311 is communicatively coupled to the bus 320 via signal line 332. In one embodiment, the GUI module 311 generates graphical data for depicting a user interface to notify a user 125 that probe vehicle data is transmitted. For example, probe vehicle data indicates a road condition such as a pot hole at the cross of Lincoln Street and Washington Street. The graphical data is used to generate a user interface for displaying to the user 125 the road condition, which is transmitted as, "a warning of, 'there is a pot hole at the cross of Lincoln Street and Washington Street' is being transmitted." In other embodiments, the GUI module 311 generates graphical data for depicting a user interface by which a user 125 inputs information to the communication system 103. The GUI module 311 sends the generated graphical data to the interface 212, causing the interface 212 to present the user interface to the user 125.

Storage Device 240

Figure 4:
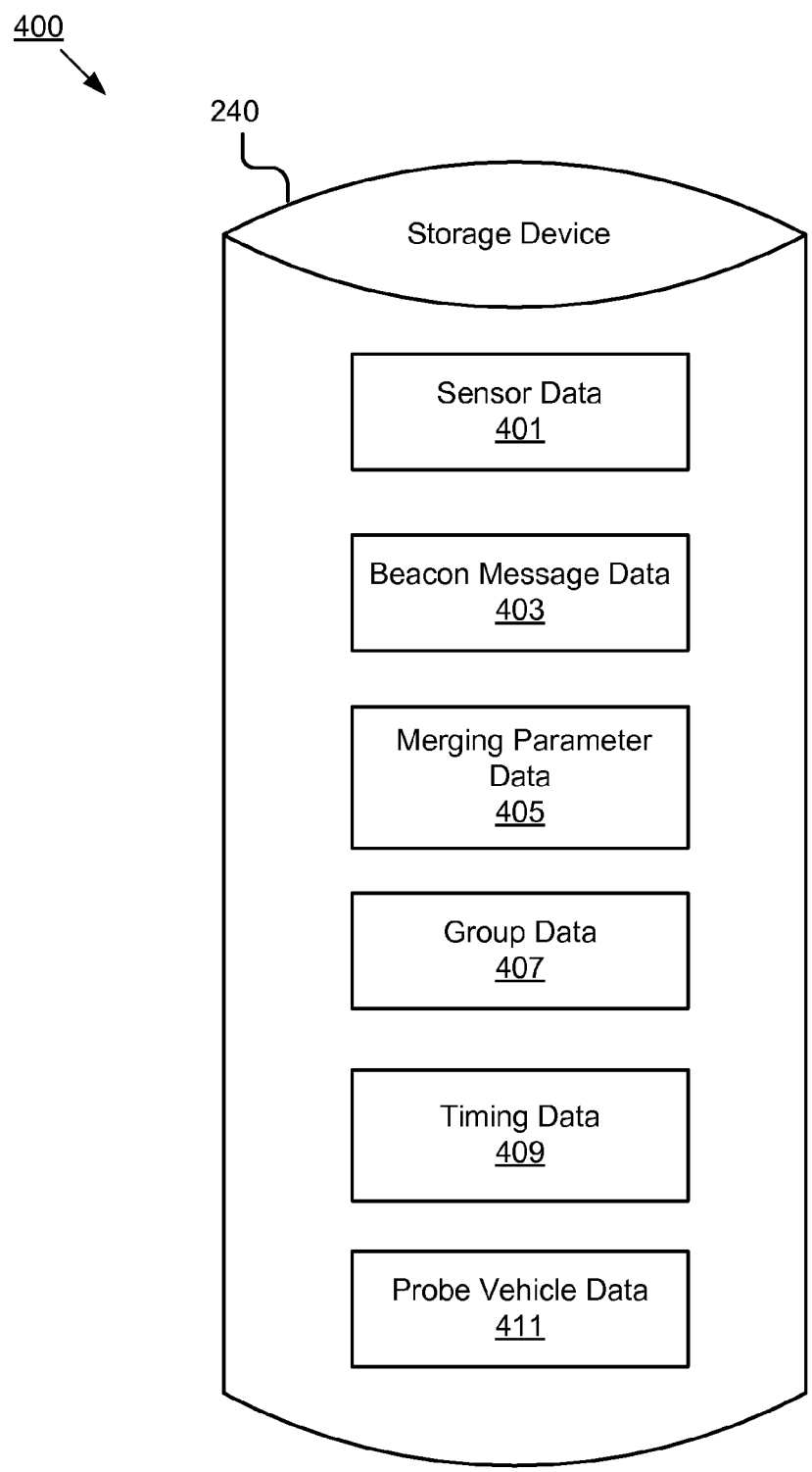
FIG. 4 is a block diagram illustrating a storage device according to one embodiment.

FIG. 4 is a block diagram 400 illustrating a storage device 240 according to one embodiment. The storage device 240 includes sensor data 401, beacon message data 403, merging parameter data 405, group data 407, timing data 409 and probe vehicle data 411. One skilled in the art will recognize that the storage device 240 may include other data for providing the functionality described herein.

The sensor data 401 is data generated by the control unit 202 based on one or more sensor signals from the sensor 231 and/or one or more images from the camera 233. For example, the sensor data 401 includes one or more of brake data, vehicle speed data, steering data, wiper data, used gas data, used wireless energy data, light data and temperature data, etc. The sensor data 401 also includes one or more environmental factors associated with the vehicle. The one or more environment factors include weather data, road condition data and traffic data, etc.

The beacon message data 403 is data describing one or more beacon messages. For example, the communication module 301 receives periodic beacon messages from the network 105. The communication module 301 stores the periodic beacon messages in the storage device 240. The beacon messages include information relevant to vehicle systems 103. For example, the beacon messages include data describing locations of vehicle systems 103.

The merging parameter data 405 is data describing one or more merging parameters. For example, the one or more merging parameters include one or more merging directions (e.g., back, front) and a maximum distance. The one or more merging directions include a first merging direction chosen by this current vehicle system 103 and a second merging direction chosen by and received from a candidate leader vehicle system 103. The maximum distance is used by the initialization module 303 to determine whether or not to form an initial group. In another example, the one or more merging parameters also include the number of leader vehicle systems 103 within the transmission range of this current vehicle system 103.

The group data 407 includes variables in relevance with a group of vehicle systems. For example, the variables include a leader flag variable, a group size variable and a level variable. The leader flag variable indicates if this current vehicle system 103 is a leader vehicle system 103 for its group. The group size variable indicates the size of the group such as the number of vehicle systems 103 included in the group where this current vehicle system 103 is. The level variable indicates the times that this current vehicle system 103 has merged with other vehicle systems 103.

The timing data 409 is data in relevance with timing. For example, the timing data includes an elapsed time and a maximum elapsed time. The elapsed time is the time spent on one recursive step of the group forming process. The maximum elapsed time is a pre-determined upper bound of the elapsed time such as five seconds, 10 seconds, etc.

The probe vehicle data 411 includes aggregated probe vehicle data generated by the aggregation module 309. For example, existing probe vehicle data stored in the storage device 240 currently is an average vehicle speed over a current group of vehicle systems. The current group is referred as to a "first group". The aggregation module 309 receives probe vehicle data such as a vehicle speed from a candidate leader vehicle system 103. The candidate leader vehicle system 103 is a leader vehicle system 103 for a second group. The received vehicle speed is an average vehicle speed over the second group. The aggregation module 309 aggregates the received vehicle speed with the average vehicle speed over the first group. For example, the aggregation module 309 calculates an updated average vehicle speed using the received vehicle speed and the average vehicle speed over the first group. Therefore the aggregation module 309 obtains an average vehicle speed over the new group including the first group and the second group.

In other examples, the probe vehicle data includes other probe vehicle data such as a moving direction, an indication that a wiper is on or off, an amount of gas used, an amount of used wireless energy, a location of a detected pot hole, etc.

Methods

Figure 5:
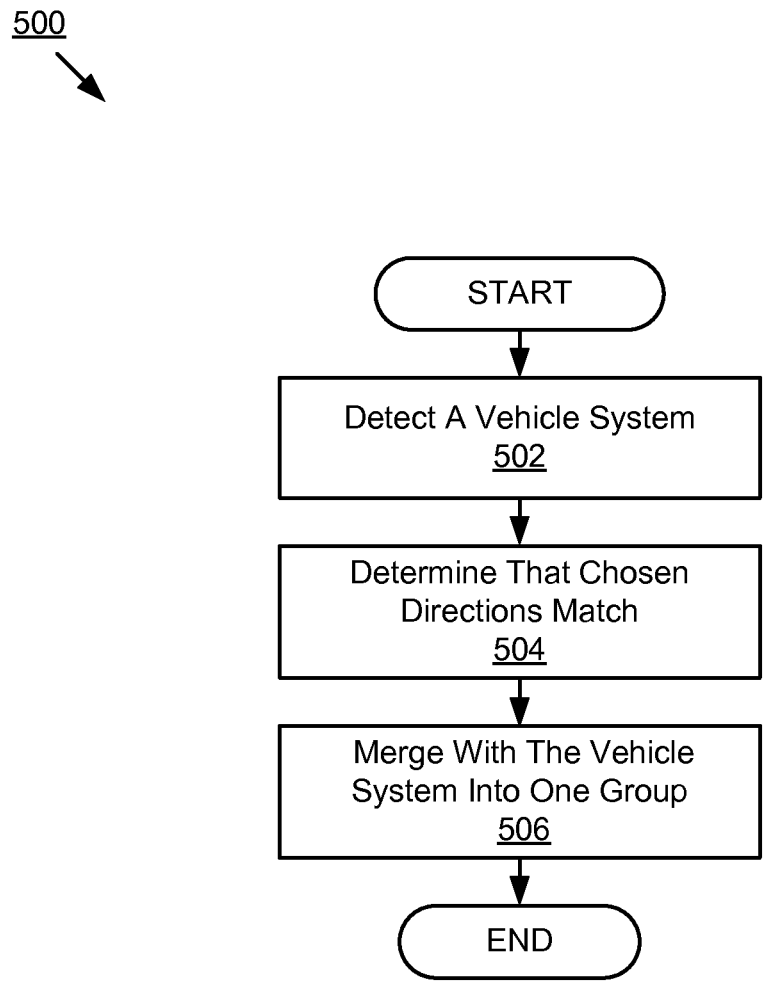
FIG. 5 is a flow diagram illustrating a method for forming a group of vehicle systems according to one embodiment.
Figure 6A:
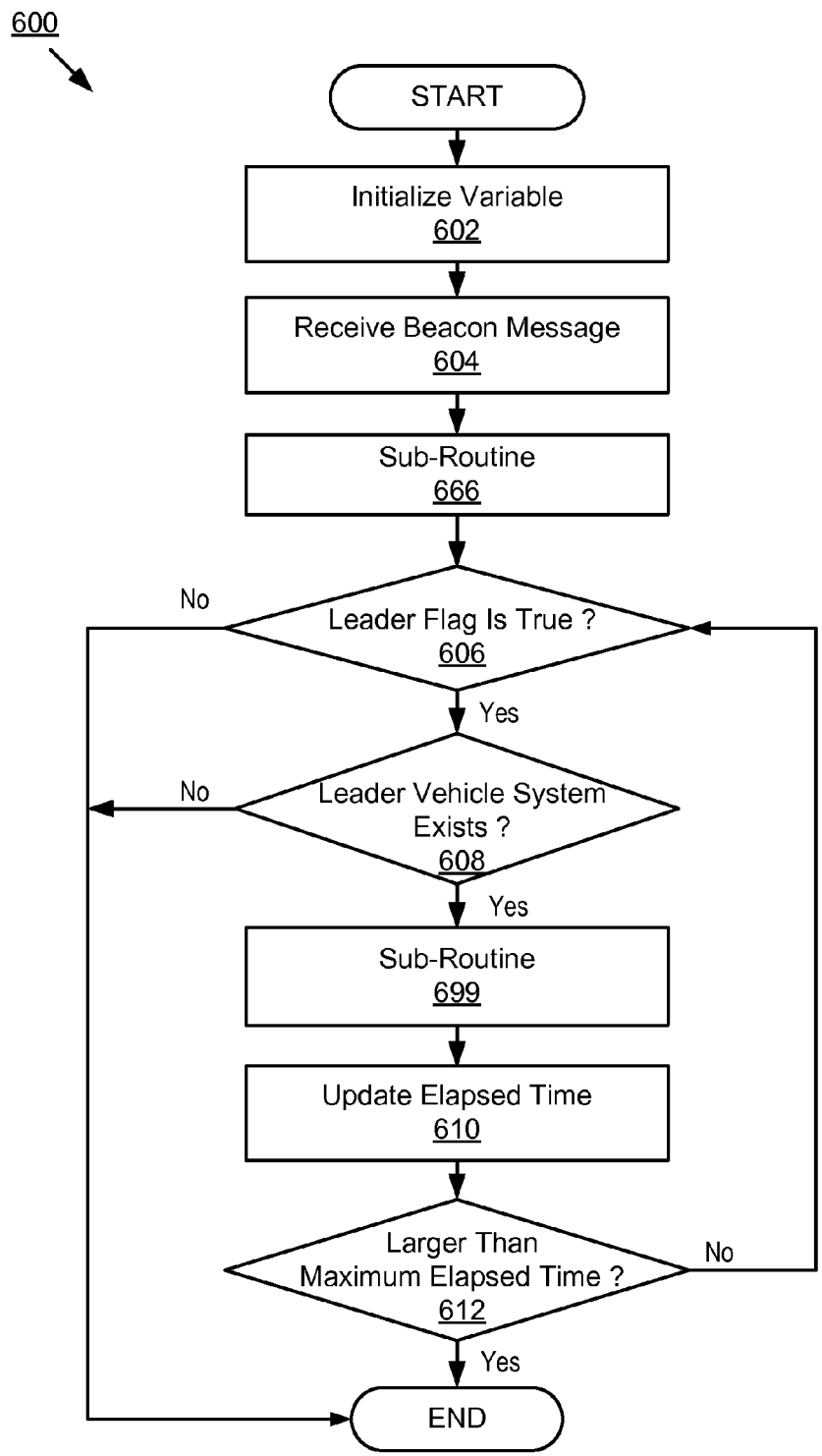
FIGS. 6A-6C are flow diagrams illustrating a method for forming groups of vehicle systems according to another embodiment.
Figure 6B:
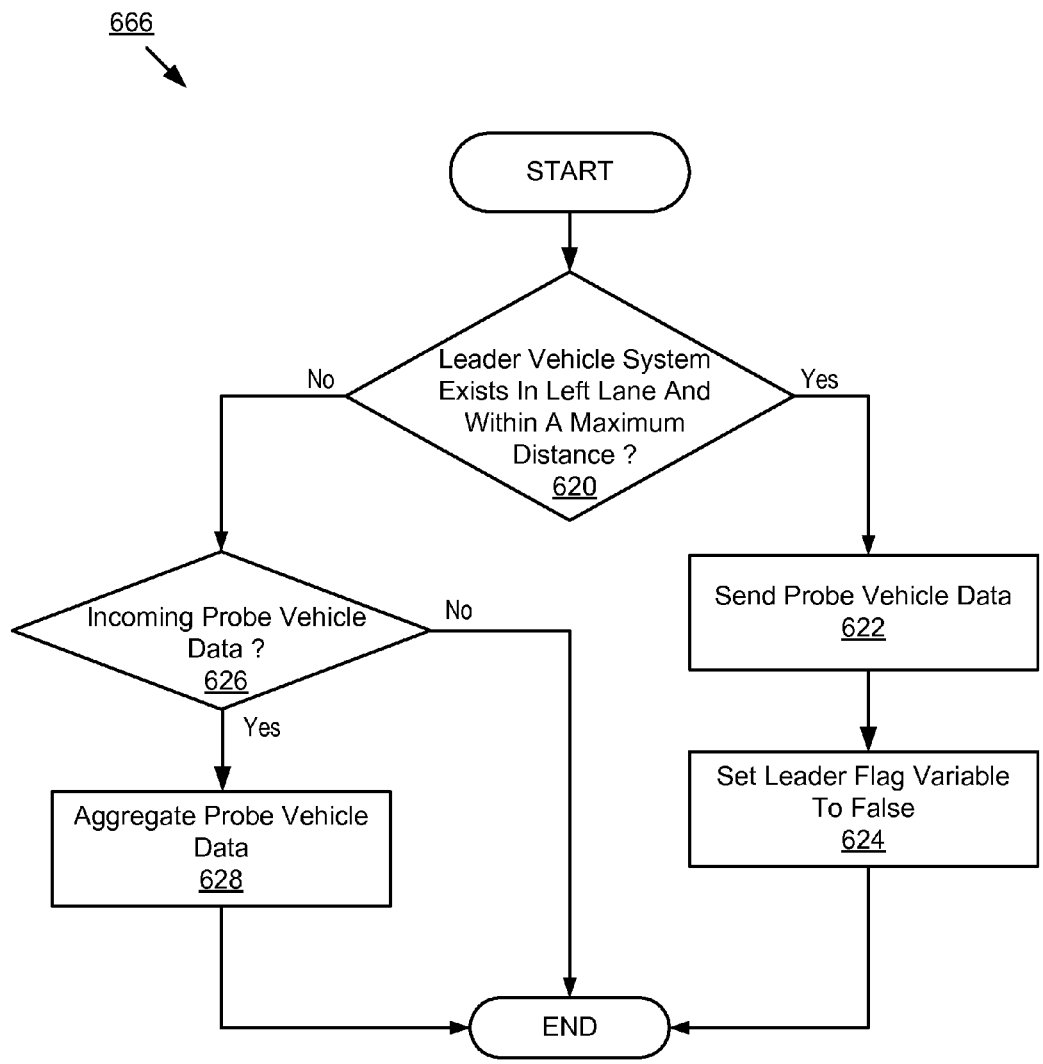
Figure 6C:
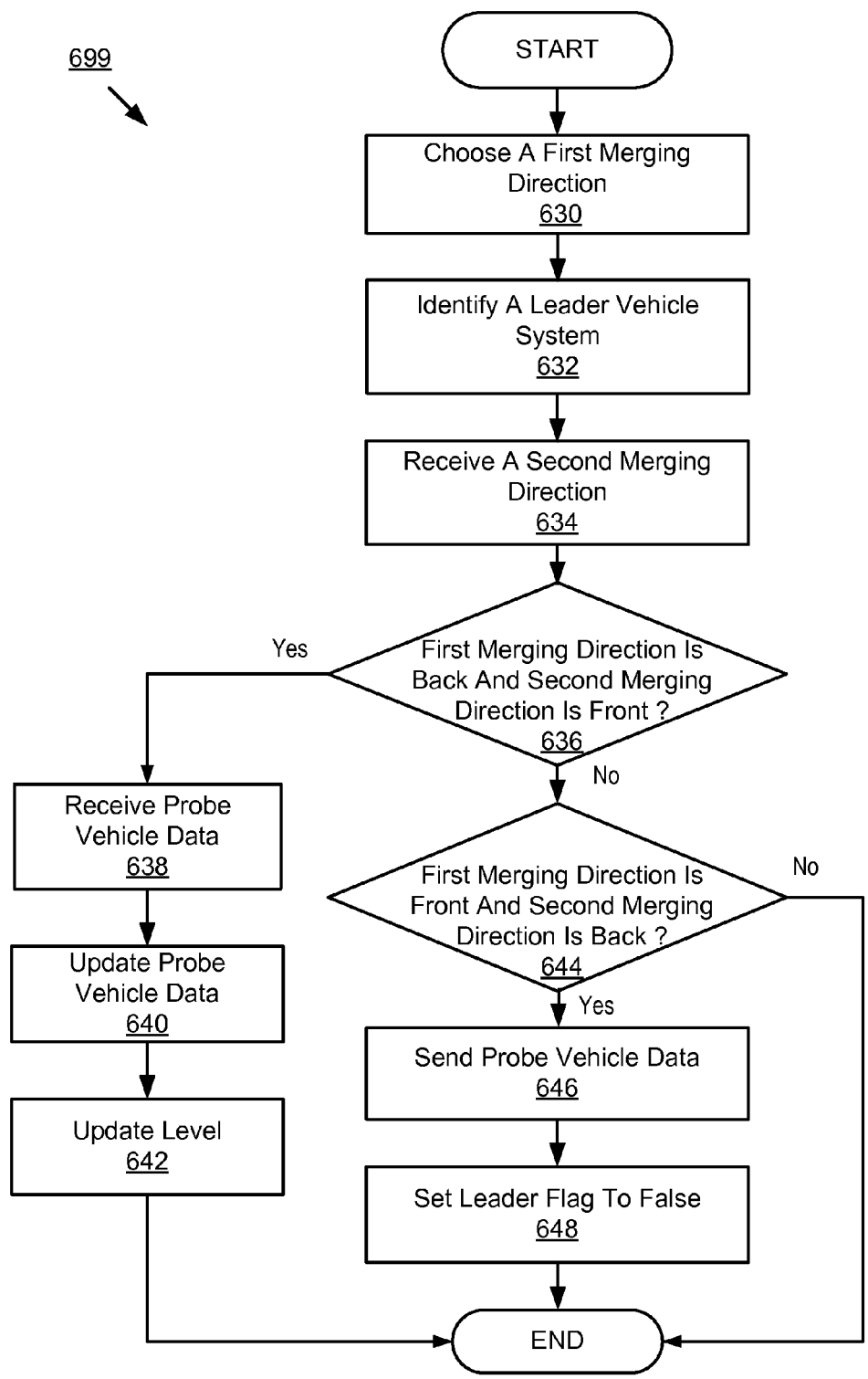

Referring now to FIGS. 5-6C, various embodiments of the method of the specification will be described.

FIG. 5 is a flow diagram illustrating a method 500 for forming a group of vehicle systems according to one embodiment. The requesting module 305 detects 502 a vehicle system 103. For example, the requesting module 305 determines if another leader vehicle system 103 exists within a transmission range of this current vehicle system 103 (that includes the requesting module 305) based on the periodic beacon messages received from the communication module 301. The transmission range is from 50 meters to hundreds of meters.

In one embodiment, if there are leader vehicle systems 103 within the transmission range, the requesting module 305 identifies one of the leader vehicle systems 103 as a candidate leader vehicle system 103.

At step 504, the determination module 307 determines that chosen directions match. For example, the determination module 307 receives a first merging direction and a second merging direction from the requesting module 305. The first merging direction is chosen by the requesting module 305. The second merging direction is chosen and received from a candidate leader vehicle system 103. The determination module 307 determines if the two merging directions match based at least in part on location information of the candidate leader vehicle system 103. For example, the determination module 307 determines if the two merging directions are directed towards each other. If the candidate leader vehicle system 103 is ahead of this current vehicle system 103 (that includes the determination module 307) and the first and second merging directions are front and back respectively, the determination module 307 determines that the two merging directions match.

At step 506, the aggregation module 309 merges with the vehicle system 103 into one group. For example, aggregation module 309 merges with the candidate leader vehicle system 103 into one group based on a determination received from the determination module 307. In one embodiment, if the determination indicates receiving probe vehicle data from the candidate leader vehicle system 103, the aggregation module 309 receives probe vehicle data from the candidate leader vehicle system 103. The aggregation module 309 updates probe vehicle data by aggregating the received probe vehicle data with existing probe vehicle data. In one embodiment, the aggregation module 309 also sets the leader flag variable accordingly.

FIG. 6A-6C are flow diagrams illustrating a method 600 for forming groups of vehicle systems according to another embodiment. The initialization module 303 initializes variables 602. For example, the initialization module 303 starts to initialize one or more variables according to a global clock provided by a GPS signal. The variables include a leader flag variable, a group size variable, a level variable, an elapsed time variable. The initialization module 303 assigns initial values to the variables.

At step 604, the initialization module 303 receives one or more beacon messages. For example, the initialization module 303 receives one or more periodic beacon messages from the network 105 via the communication module 301. The periodic beacon messages include location information of other leader vehicle systems 103.

Referring now to FIG. 6B, the sub-routine 666 is illustrated according to one embodiment. The initialization module 303 determines 620 if any leader vehicle system 103 exists in a left lane and within a maximum distance. For example, the initialization module 303 determines if there is any leader vehicle system 103 in a left lane relative to this current vehicle system 103 (that includes the initialization module 303) and within a maximum distance to this current vehicle system 103 (that includes the initialization module 303) based at least in part on location information described in the received periodic beacon messages. The maximum distance is a pre-determined distance such as five meters. If the initialization module 303 determines that there is a leader vehicle system 103 in a left lane and within the maximum distance, the sub-routine 666 proceeds to step 622. Otherwise, the sub-routine 666 proceeds to step 626.

At step 622, the initialization module 303 sends probe vehicle data. For example, the initialization module 303 sends its probe vehicle data to the leader vehicle system 103 in the left lane and within the maximum distance. For example, the probe vehicle data is a vehicle speed. At step 624, the initialization module 303 sets the leader flag variable to false. In this way, the initialization module 303 merges with the leader vehicle system 103 in the left lane to form a group. The leader vehicle system 103 in the left lane is the new leader vehicle system 103 for the new group.

At step 626, the initialization module 303 determines if there is incoming probe vehicle data. For example, the initialization module 303 determines if there is any probe vehicle data coming from a leader vehicle system 103 in a right lane and within the maximum distance. If the initialization module 303 determines that there is incoming probe vehicle data from a leader vehicle system 103 in a right lane and within the maximum distance, the sub-routine 666 proceeds to step 628. Otherwise, the sub-routine 666 ends.

At step 628, the initialization module 303 aggregates probe vehicle data. For example, the initialization module 303 receives incoming probe vehicle data such as a vehicle's speed from a leader vehicle system 303 in a right lane and within a maximum distance. The initialization module 303 aggregates the incoming vehicle speed with its own speed by calculating an average vehicle speed over the new formed group including the leader vehicle system 303 in a lane to the right and this current vehicle system 103 (that includes the initialization module 303). This current vehicle system 103 (that includes the initialization module 303) is the new leader vehicle system 103 for the new formed group.

After step 624 and step 628, the sub-routine 666 ends and the method 600 reverts to step 606. Referring back to FIG. 6A, at step 606 the determination module 307 determines if the leader flag variable is true. If the determination module 307 determines that the leader flag variable is true, the method 600 proceeds to step 608. Otherwise, the method 600 ends.

At step 608, the requesting module 305 determines if any other leader vehicle systems 103 exist within a transmission range. For example, the requesting module 305 determines if there are any other leader vehicle systems 103 within a transmission range of this current vehicle system 303 (that includes the requesting module 305) based at least in part on the periodic beacon messages received from the communication module 301. The transmission range is from 50 meters to hundreds of meters. For example, the transmission range is 100 meters. If the requesting module 305 determines that there is at least one leader vehicle system 103 within the transmission range, the method 600 proceeds to a sub-routine 699. Otherwise, the method 600 ends.

Referring now to FIG. 6C, the sub-routine 699 is illustrated according to one embodiment. At step 630, the requesting module 305 chooses a first merging direction. For example, the requesting module 305 chooses a first merging direction from either back or front by a probability of one half.

At step 632, the requesting module 305 identifies a leader vehicle system 103. For example, the requesting module 305 identifies a leader vehicle system 103 from the detected leader vehicle systems 103 within the transmission range. In one embodiment, the requesting module 305 identifies a closest leader vehicle system 103 in the first merging direction from the detected leader vehicle systems 103 within the transmission range. For example, the closest leader vehicle system 103 is adjacent to this current vehicle system 103 (that includes the requesting module 305). The identified leader vehicle system 103 is referred as to a candidate leader vehicle system 103.

At step 634, the requesting module 305 receives a second merging direction. For example, the requesting module 305 sends a merging request to the candidate leader vehicle system 103. The requesting module 305 receives a response to the merging request from the candidate leader vehicle system 103. The response to the merging request includes a second merging direction chosen by the candidate leader vehicle system 103.

At step 636, the determination module 307 determines if the first merging direction is back and if the second direction is front. In one embodiment, the determination module 307 determines that this current vehicle system 103 (that includes the determination module 307) is ahead of the candidate leader vehicle system 103 based on the location information of the candidate leader system 103. Then the determination module 307 determines if the first merging direction is back and the second merging direction is front. If the determination module 307 determines that the first merging direction is back and the second merging direction is front, the sub-routine 699 proceeds to step 638. Otherwise, the sub-routine 699 proceeds to step 644.

At step 638, the aggregation module 309 receives probe vehicle data. For example, the aggregation module 309 receives a determination from the determination module 307. The determination indicates receiving probe vehicle data. The aggregation module 309 receives probe vehicle data from the candidate leader vehicle system 103. At step 640, the aggregation module 309 updates probe vehicle data. For example, the probe vehicle data is a vehicle speed. The aggregation module 309 calculates an updated average vehicle speed using the received probe vehicle data and the existing probe vehicle data in the storage device 240. At step 642, the aggregation module 309 updates the level variable. For example, the aggregation module 309 increases the value of the level variable by one.

At step 644, the determination module 307 determines if the first merging direction is front and the second merging direction is back. In one embodiment, the determination module 307 determines that this current vehicle system 103 (that includes the determination module 307) is behind the candidate leader vehicle system 103. Then the determination module 307 determines if the first merging direction is front and the second merging direction is back. If the determination module 307 determines that the first merging direction is front and the second merging direction is back, the sub-routine 699 proceeds to step 646. Otherwise, the sub-routine 699 ends.

At step 646, the aggregation module 309 sends probe vehicle data. For example, the aggregation module 309 receives a determination that indicates sending probe vehicle data. The aggregation module 309 sends existing aggregated probe vehicle data to the candidate leader vehicle system 103. For example, the aggregation module 309 sends the most recently aggregated probe vehicle data to the candidate leader vehicle system 103. At step 648, the aggregation module 309 sets the leader flag variable to false. The false leader flag variable indicates that this current vehicle system 103 (that includes the aggregation module 309) is no longer a leader vehicle system 103. In this way, this current vehicle system 103 (that includes the aggregation module 309) merges with the candidate leader vehicle system 103 into a new group and the candidate leader vehicle system 103 becomes the new leader vehicle system 103 for the new group.

After either of step 642 and step 648, the sub-routine 699 ends and the method 600 reverts to step 610. Referring back to FIG. 6A, at step 610 the communication module 301 updates the elapsed time. For example, the communication module 301 updates the elapsed time by adjusting the value of the elapsed time variable according to a global clock. In one embodiment, the communication module 301 sends the updated elapsed time variable to the determination module 307.

At step 612, the determination module 307 determines if the elapsed time is larger than the maximum elapsed time. For example, the maximum elapsed time is a pre-determined time upper bound for the elapsed time such as five seconds, 10 seconds, etc. If the determination module 307 determines that the elapsed time is larger than the maximum elapsed time, the method 600 ends. Otherwise, the method 600 returns to step 606 to determine if the leader flag variable is true and the method 600 starts again from step 606.

Graphical Representations

FIGS. 7A-7D are graphical representations illustrating a vehicular network where groups of vehicle systems are formed step by step according to one embodiment.

Figure 7A:
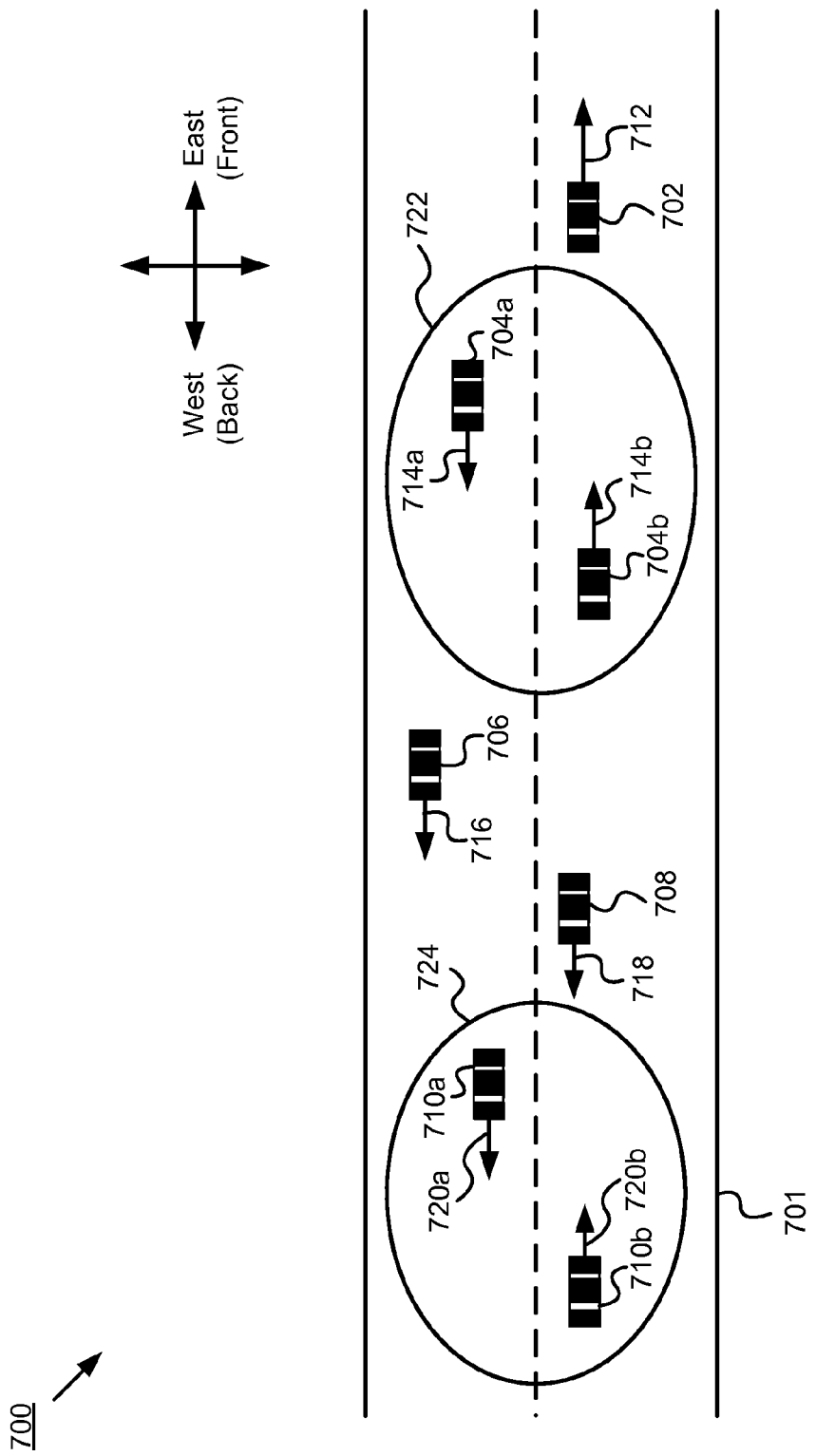

Referring to FIG. 7A, depicted is a graphical representation 700 illustrating a vehicular network where groups of vehicle systems are formed in one step according to one embodiment. Element 701 is a graphical representation of a road 701. For example, the road 701 is a highway. Elements 702, 704a, 704b, 706, 708, 710a, 710b are graphical representations of vehicle systems 702, 704a, 704b, 706, 708, 710a, 710b. For example, the vehicle systems 702, 704a, 704b, 706, 708, 710a, 710b are moving on the road 701 towards the east (front).

Elements 712, 714a, 714b, 716, 718, 720a, 720b are graphical representations of merging directions 712, 714a, 714b, 716, 718, 720a, 720b chosen by the vehicle systems 702, 704a, 704b, 706, 708, 710a, 710b respectively. For example, the vehicle system 704a chooses the merging direction 714a and the vehicle system 704b chooses the merging direction 714b.

Elements 722, 724 are graphical representations of vehicle groups 722, 724. In the depicted embodiment, the vehicle group 722 includes the vehicle systems 704a, 704b. The vehicle systems 704a, 704b merge into one vehicle group 722 because their merging directions 714a, 714b match. The vehicle group 724 includes the vehicle systems 710a, 710b. The vehicle systems 710a, 710b merge into one vehicle group 724 because their merging directions 720a, 720b match.

Referring to FIG. 7B, depicted is a graphical representation 797 illustrating a vehicular network where groups of vehicle systems are formed in one step according to one embodiment. Element 701 is the same as that in FIG. 7A and it is a graphical representation of a road 701. Elements 732a, 732b, 732c, 736a, 736b, 740a, 740b are graphical representations of vehicle systems 732a, 732b, 732c, 736a, 736b, 740a, 740b, respectively.

Elements 730, 734, 738, 742 are graphical representations of vehicle groups 730, 734, 738, 742. The vehicle systems 732a, 736a, 740a are leader vehicle systems 732a, 736a, 740a for the vehicle groups 730, 734, 738 respectively. Elements 731, 735, 739 are graphical representations of merging directions chosen by the leader vehicle systems 732a, 736a, 740a respectively.

In the depicted embodiment, the vehicle groups 730, 734 merge into one big vehicle group 742 because the leader vehicle systems 732a, 736a for the vehicle groups 730, 734 respectively choose matched merging directions 731, 735.

Figure 7C:
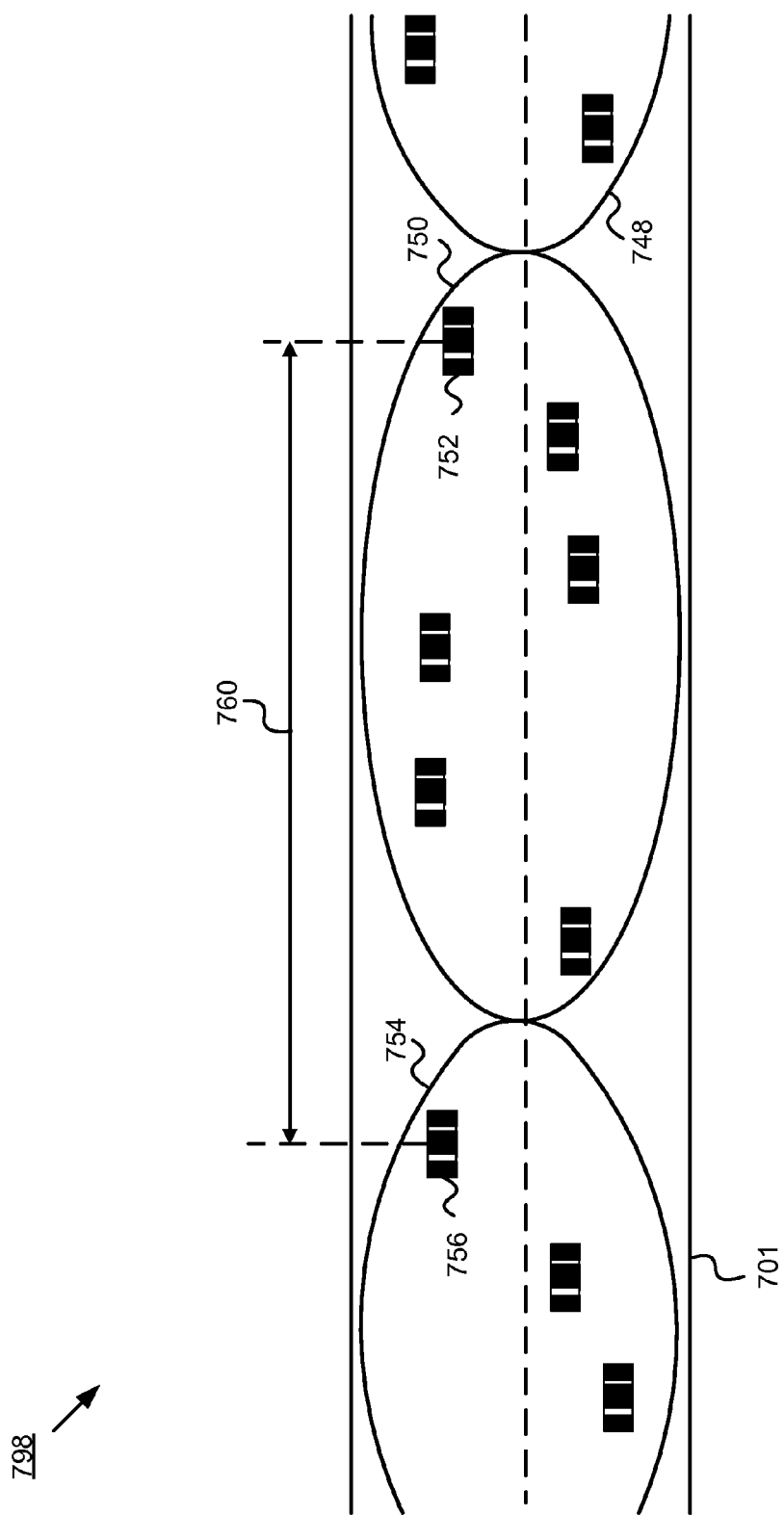

Referring to FIG. 7C, depicted is a graphical representation 798 illustrating a vehicular network where groups of vehicle systems are formed in one step according to one embodiment. Element 701 is the same as that seen in FIG. 7A, which is a graphical representation of a road 701. Elements 748, 750, 754 are graphical representations of vehicle groups 748, 750, 754. Elements 752, 756 are graphical representations of leader vehicle systems 752, 756 for the vehicle groups 750, 754 respectively.

Element 760 is a graphical representation of the distance 760 between the leader vehicle systems 752, 756. If the distance 760 is larger than a transmission range, the vehicle groups 750, 754 will not merge. For example, the transmission range is from 50 meters to hundreds of meters such as 100 meters.

Figure 7D:
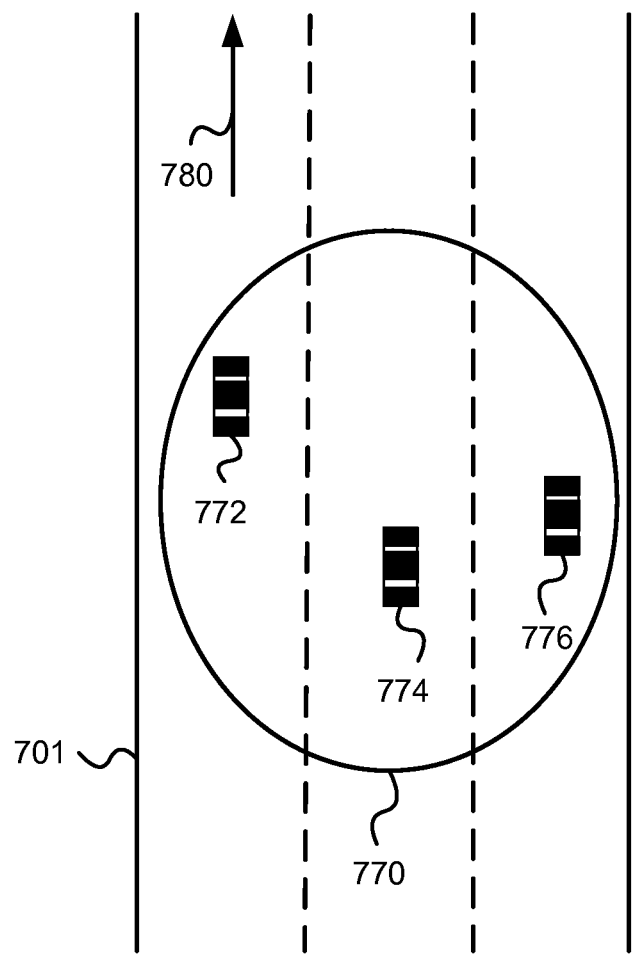

Referring now to FIG. 7D, depicted is graphical representation 799 illustrating a vehicular network where an initial group is formed according to one embodiment. Element 701 is the same as that seen in FIG. 7A, which is a graphical representation of a road 701. Element 780 is a graphical representation of a driving direction of the road 701.

Elements 772, 774, 776 are graphical representations of vehicle systems 772, 774, 776. Element 770 is a graphical representation of an initial vehicle group 770. The initial vehicle group 770 includes vehicle systems 772, 774, 776. The vehicle system 772 is a leader vehicle system 772 for the initial vehicle group 770 since it is in the leftmost lane of the road 701.

Performance Evaluation

The performance of the system and method for constructing groups of vehicle systems is theoretically evaluated. The average number of parallel steps to form a group of size "n" is log 5/4 n or less. The average length of a final group is more than a transmission range. The average group size is more than a product of a car density and the transmission range.

FIG. 8 shows a table 800 illustrating relationships between car densities and group sizes and group forming times according to one embodiment. The table 800 includes a car density 802, a group size 804 and a group forming time 806. The car density 802 indicates the number of vehicle systems 103 in one meter of a road. The group size 804 indicates the number of vehicle systems 103 in one vehicle group. The group forming time 806 indicates how much time elapses during the group forming process. The group forming process starts according to a global clock and terminates when every vehicle system 103 stops merging with others.

Simulation Results

Figure 9A:
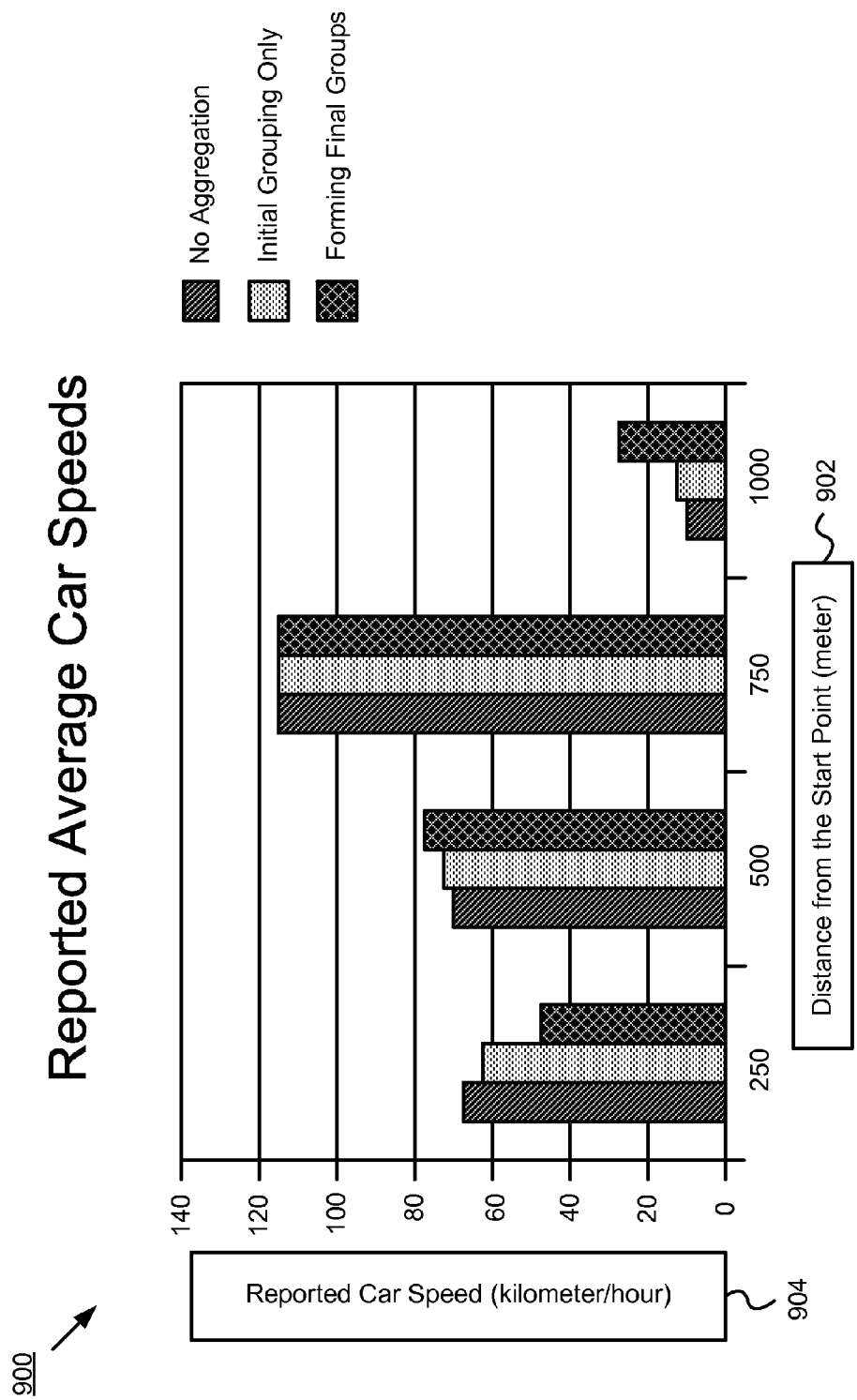
Figure 9B:
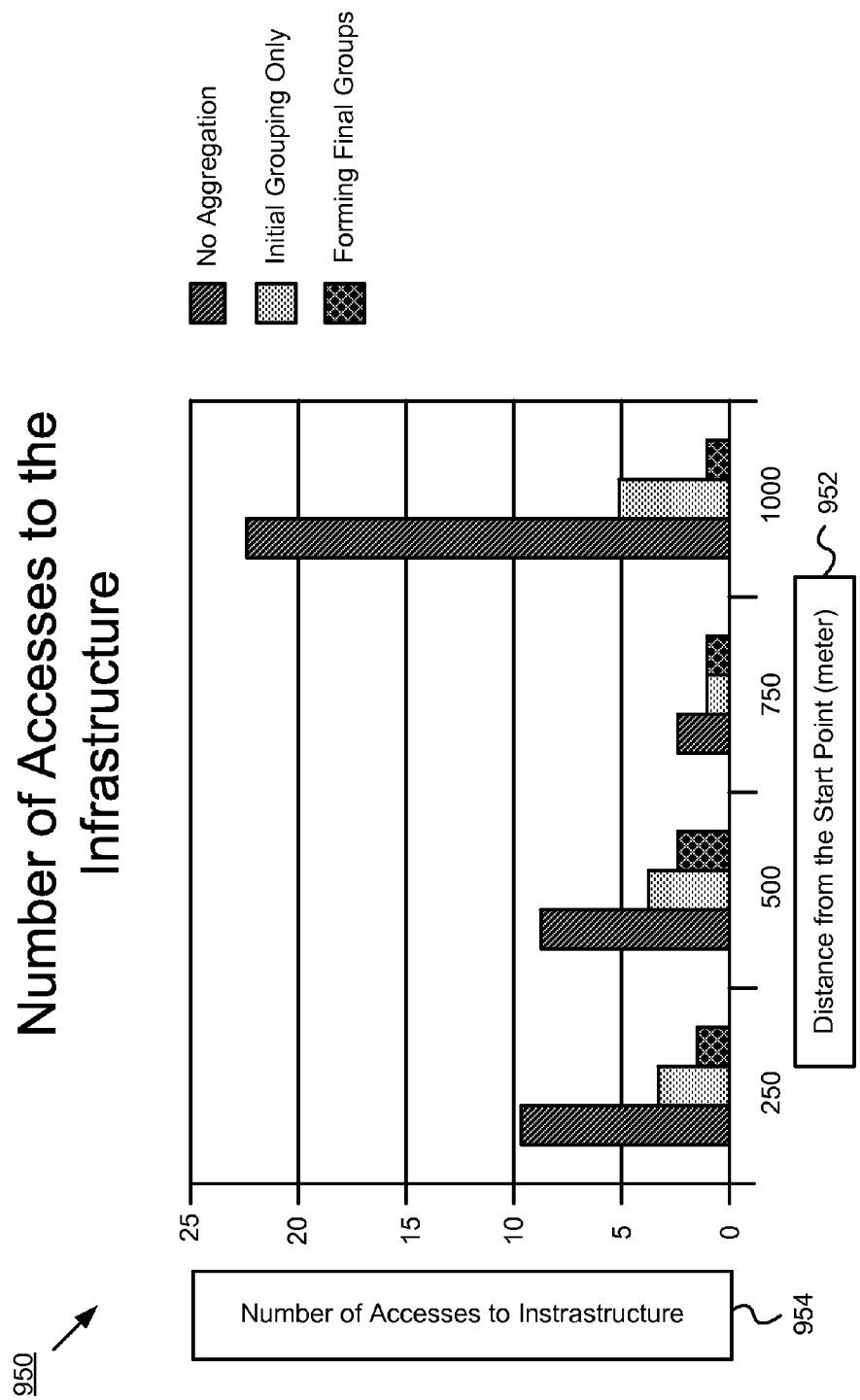

FIGS. 9A-9C are charts illustrating simulation results at different distances from a start point using three schemes according to one embodiment. The three schemes are: no aggregation (e.g., every vehicle system 103 reports to the closest RSU individually); initial grouping only (e.g., initial groups formed only and the leader vehicle system 103 for each initial group reports aggregated vehicle speeds over the initial group to the closest RSU); and forming final groups (e.g., the group forming process finishes and the leader vehicle system 103 for each group reports aggregated vehicle speeds over the group to the closest RSU). The distances from the start points are 250 meters, 500 meters, 750 meters and 1000 meters. At each distance, there is an RSU. The simulation depends on parameters including a total highway length, a number of involved cars, a number of lanes of the highway and a car density. The total highway length is 1025 meters. The number of involved cars is 107. The number of lanes of the highway is three. The car density is 0.105 vehicles per meter along the highway.

Referring to FIG. 9A, depicted is a chart 900 illustrating reported average car speeds at different distances from the start point using three schemes. The chart 900 includes an x-axis 902 which represents the distance from the start point (meter) and a y-axis representing the reported car speed (kilometer/hour). The chart 900 displays comparisons between reported average car speeds using three schemes at different distances from the start point. At a distance of 1000 meters, there is an obvious difference between the reported average car speeds using the three schemes; this is not due to inaccuracy of the reported average car speed using the scheme of forming final groups: there is traffic congestion right before the RSU at 1000 meters. Since using the scheme of no aggregation only reports speeds around the RSU, the reported car speed using the scheme of no aggregation is lower. However, when using the scheme of forming final groups, speeds before the traffic congestion are remembered in growing group sizes, so the reported car speed using the scheme of forming final groups is higher. As a result, the reported average car speed using the scheme of forming final groups is more accurate than the other two schemes.

Referring to FIG. 9B, depicted is a chart 950 illustrating the number of accesses to the infrastructures at different distances from the start point using three schemes. The chart 950 includes an x-axis representing the distance from the start point (meter) 952 and a y-axis representing the number of accesses to infrastructure 954. The chart 950 shows that the number of accesses to the infrastructures (e.g., the RSUs) using the scheme of forming final groups are all much smaller than those using the scheme of no aggregation. Therefore, it is apparent that the group forming methods have the advantage in terms of the number of accesses to the infrastructure, since it drastically reduces the wireless usage especially compared to the scheme of no aggregation.

Referring now to FIG. 9C, depicted is a chart 980 illustrating group sizes at different distances from the start point using three schemes. The chart 980 includes an x-axis representing the distance from the start point (meter) 982 and a y-axis representing the group size when it reports 984. According to the performance evaluation and assuming that the transmission range is 100 meters and the car density is 0.105 vehicles per meter, the theoretical final group size is 10.5 vehicles. The chart 980 shows results consistent to the theoretical final group size except for the results of the group size at a distance of 750 meters. The theoretical group size is based at least in part on car density. The car density is averaged over the highway. However, between distances of 500 meters and 750 meters, the number of vehicles on the highway is more sparse, while the number of vehicles on the highway is denser between distances of 750 meters and 1000 meters. Therefore, at the distance of 750 meters the group size is smaller than 10.5 vehicles and at distance of 1000 meters the group size is larger than 10.5 vehicles.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for forming a first group including a first leader vehicle system, the method comprising:
   identifying, by one or more processors, a second leader vehicle system within a transmission range, the second leader vehicle system being in a second group;
   choosing, by the one or more processors, a first merging direction that is a physical direction relative to the first leader vehicle system;
   receiving, by the one or more processors, a second merging direction chosen by the second leader vehicle system, the second merging direction being a physical direction relative to the second leader vehicle system;
   determining, by the one or more processors, that the first merging direction matches the second merging direction; and
   merging, by the one or more processors, with the second leader vehicle system to form the first group including the first leader vehicle system by aggregating probe vehicle data from the second leader vehicle system based at least in part on the determination that the first merging direction matches the second merging direction.

2. The method of claim 1, wherein the first merging direction and the second merging direction are chosen from a set of two elements.

3. The method of claim 1, wherein the first leader vehicle system is in a third group adjacent to the second group before merging with the second leader vehicle system to form the first group including the first leader vehicle system.

4. The method of claim 1 further comprising:
   receiving one or more beacon messages; and
   determining a location of the second leader vehicle system based at least in part on the one or more beacon messages.

5. The method of claim 4, wherein determining that the first merging direction matches the second merging direction further comprises:
   determining that the first merging direction is directed toward the second merging direction based at least in part on the location of the second leader vehicle system.

6. The method of claim 1, wherein aggregating probe vehicle data from the second leader vehicle system based at least in part on the determination that the first merging direction matches the second merging direction further comprises:
   receiving probe vehicle data from the second leader vehicle system;
   updating existing probe vehicle data based at least in part on the received probe vehicle data from the second leader vehicle system.

7. The method of claim 1 further comprising:
   receiving probe vehicle data from a third leader vehicle system in a right lane within a maximum distance; and updating existing probe vehicle data based at least in part on the received probe vehicle data from the third leader vehicle system in the right lane within the maximum distance.

8. A first leader vehicle system for forming a first group including the first leader vehicle system, the first leader vehicle system comprising:
   a requesting module for identifying a second leader vehicle system within a transmission range, the second leader vehicle system being in a second group, the requesting module choosing a first merging direction that is a physical direction relative to the first leader vehicle system and receiving a second merging direction chosen by the second leader vehicle system, the second merging direction being a physical direction relative to the second leader vehicle system;
   a determination module communicatively coupled to the requesting module, the determination module determining that the first merging direction matches the second merging direction; and
   an aggregation module communicatively coupled to the determination module, the aggregation module aggregating probe vehicle data from the second leader vehicle system based at least in part on the determination that the first merging direction matches the second merging direction so that the first leader vehicle system merges with the second leader vehicle system to form the first group.

9. The first leader vehicle system of claim 8, wherein the first merging direction and the second merging direction are chosen from a set of two elements.

10. The first leader vehicle system of claim 8, wherein the first leader vehicle system is in a third group adjacent to the second group before merging with the second leader vehicle system to form the first group.

11. The first leader vehicle system of claim 8 further comprising a communication module communicatively coupled to the requesting module, the communication module configured to receive one or more beacon messages, the requesting module configured to receive the one or more beacon messages from the communication module and to determine a location of the second leader vehicle system based at least in part on the one or more beacon messages.

12. The first leader vehicle system of claim 11, wherein determining that the first merging direction matches the second merging direction further comprises:
   determining that the first merging direction is directed toward the second merging direction based at least in part on the location of the second leader vehicle system.

13. The first leader vehicle system of claim 8, wherein aggregating probe vehicle data from the second leader vehicle system based at least in part on the determination that the first merging direction matches the second merging direction further comprises:
   receiving probe vehicle data from the second leader vehicle system;
   updating existing probe vehicle data based at least in part on the received probe vehicle data from the second leader vehicle system.

14. The first leader vehicle system of claim 8 further comprising an initialization module communicatively coupled to the aggregation module, the initialization module configured to receive probe vehicle data from a third leader vehicle system in a right lane within a maximum distance, the aggregation module further configured to update existing probe vehicle data based at least in part on the received probe vehicle data from the third leader vehicle system in the right lane within the maximum distance.

15. A computer program product comprising a non-transitory computer readable medium encoding instructions that, in response to execution by a computing device, cause the computing device to perform operations comprising:
   identifying a second leader vehicle system within a transmission range, the second leader vehicle system being in a second group;
   choosing a first merging direction that is a physical direction relative to the first leader vehicle system;
   receiving a second merging direction chosen by the second leader vehicle system, the second merging direction being a physical direction relative to the second leader vehicle system;
   determining that the first merging direction matches the second merging direction; and
   merging with the second leader vehicle system to form the first group including the first leader vehicle system by aggregating probe vehicle data from the second leader vehicle system based at least in part on the determination that the first merging direction matches the second merging direction.

16. The computer program product of claim 15, wherein the first merging direction and the second merging direction are chosen from a set of two elements.

17. The computer program product of claim 15, wherein the first leader vehicle system is in a third group adjacent to the second group before merging with the second leader vehicle system to form the first group including the first leader vehicle system.

18. The computer program product of claim 15, instructions encoded in the computer readable medium when executed cause the computing device to perform operations further comprising:
   receiving one or more beacon messages; and
   determining a location of the second leader vehicle system based at least in part on the one or more beacon messages.

19. The computer program product of claim 18, wherein determining that the first merging direction matches the second merging direction further comprises:
   determining that the first merging direction is directed toward the second merging direction based at least in part on the location of the second leader vehicle system.

20. The computer program product of claim 15, wherein aggregating probe vehicle data from the second leader vehicle system based at least in part on the determination that the first merging direction matches the second merging direction further comprises:
   receiving probe vehicle data from the second leader vehicle system;
   updating existing probe vehicle data based at least in part on the received probe vehicle data from the second leader vehicle system.

21. The computer program product of claim 11, wherein instructions encoded in the computer readable medium when executed cause the computing device to perform operations further comprising:
   receiving probe vehicle data from a third leader vehicle system in a right lane within a maximum distance; and
   updating existing probe vehicle data based at least in part on the received probe vehicle data from the third leader vehicle system in the right lane within the maximum distance.

* * * * *